United States Patent [19]
Kim

[11] Patent Number: 5,951,299
[45] Date of Patent: Sep. 14, 1999

[54] METHOD FOR MATHEMATICAL REPRESENTATION, MANIPULATION AND PROBLEM SOLVING, AND KIT

[76] Inventor: Linda S. Kim, 1842 Westwood Rd., Troy, Ohio 45373

[21] Appl. No.: 09/005,493

[22] Filed: Jan. 12, 1998

Related U.S. Application Data

[60] Provisional application No. 60/035,198, Jan. 14, 1997.
[51] Int. Cl.⁶ .............................. G09B 19/02; G09B 1/00
[52] U.S. Cl. ........................ 434/188; 434/189; 434/193; 434/205; 434/209
[58] Field of Search .................................. 434/188, 190, 434/193, 205, 210, 189, 200, 209

[56] References Cited

U.S. PATENT DOCUMENTS

| | | |
|---|---|---|
| D. 163,085 | 5/1951 | Bishop . |
| 367,223 | 7/1887 | Moody . |
| 2,842,870 | 7/1958 | Lilly . |
| 2,950,542 | 7/1960 | Steelman .................................. 434/195 |
| 3,357,116 | 12/1967 | Bazacos . |
| 3,381,394 | 5/1968 | Munro ................................. 74/424.8 A |
| 3,777,416 | 12/1973 | Milligan et al. ......................... 434/193 |
| 3,837,096 | 9/1974 | Sterling .................................... 434/191 |
| 4,382,794 | 5/1983 | Preus ....................................... 434/193 |
| 4,808,111 | 2/1989 | Pratt . |
| 5,040,987 | 8/1991 | Frazier .................................... 434/188 |
| 5,139,423 | 8/1992 | McCormack et al. .................. 434/201 |
| 5,242,171 | 9/1993 | Hata ........................................ 273/292 |
| 5,423,682 | 6/1995 | Hildebrandt ............................ 434/195 |
| 5,529,497 | 6/1996 | Bigold ..................................... 434/191 |

FOREIGN PATENT DOCUMENTS

| | | |
|---|---|---|
| 175049 | 1/1935 | Sweden ................................. 434/193 |
| 768450 | 2/1957 | United Kingdom .................... 434/193 |

OTHER PUBLICATIONS

Linda S. Kim; "No Memorization Addition & Subtraction—Addition Workbook 1", 1991, USA.
Linda S. Kim; "No Memorization Addition & Subtraction—Addition Workbook 2", 1991, USA.
Linda S. Kim; "No Memorization Addition & Subtraction—Subtraction Workbook 1", 1991, USA.
Linda S. Kim; "No Memorization Addition & Subtraction—Subtraction Workbook 2", 1991, USA.

*Primary Examiner*—Kien T. Nguyen
*Assistant Examiner*—Michael B. Priddy
*Attorney, Agent, or Firm*—David C. Purdue; John C. Purdue

[57] ABSTRACT

The present invention involves the use of numerical digits with markers and attribute tags as a means to represent quantities, facilitate mathematical manipulation, and solve problems. The given number of markers on each digit corresponds to the value of the digit. For example, the digit three is enhanced with three markers. The attribute tags are also provided with a given number of markers, for example, ten, for math problems in base ten. The digits and the attribute tags are then used to represent and solve math problems including, but not limited to, learning ones, tens, hundreds, thousands columns, addition, multiplication, subtraction, and division, of whole numbers, of fractions, of negative whole numbers and of negative fractions, as well as decimals and exponents. The problems are quantitatively viewed, manipulated, and solved directly on the numerical digits incorporating the markers and attribute tags. A kit is disclosed for use in practicing the invention and the kit comprises digits represented on a mutable substrate and having a number of markers corresponding with the numerical value of the digit and attribute tags represented on a mutable substrate and having a number of mutable markers corresponding with the base number in a given base number systems.

7 Claims, 27 Drawing Sheets

METHOD FOR MATHEMATICAL REPRESENTATION, MANIPULATION AND PROBLEM SOLVING, AND KIT

This application claims benefit of provisional application number 60/035,198 filed Jan. 14, 1997.

BACKGROUND OF THE INVENTION

1. Field of the Invention

The present invention relates generally to a mathematical teaching or learning method in which numerical quantities can be represented directly on the number. By this means, many of the basic functions of mathematics such as learning ones, tens, hundreds, thousands columns, addition, multiplication, exponents, subtraction, division, fractions (addition, subtraction, multiplication, division of fractions), negative numbers (addition, subtraction, multiplication, division of negative numbers both fractional and whole), decimals, and the like are quantitatively represented, viewed, manipulated, and solved directly on the numbers themselves. The invention represents a method. The numbers may be represented on a mutable substrate, such as paper and a kit for practicing the method is part of the invention. The method of the invention may be adapted to other platforms such as computer programs and video games within the scope of this invention.

2. Description of the Prior Art

There is a diverse and eclectic body of prior art directed to mathematical learning and teaching. During a search directed to the subject matter of this invention, the following US patents were noted.

U.S. Design Pat. No. 163,085 (Bishop) and Utility Pat. Nos. 367,223 (Moody), U.S. Pat. No. 2,842,870 (Lilly), U.S. Pat. No. 3,357,116 (Bazacos), U.S. Pat. No. 4,808,111 (Pratt) and U.S. Pat. No. 5,040,987 (Frazier).

The Lilly patent discloses manipulatives for representing various numbers and numerical representations of numbers. Referring to FIGS. 5 and 6, there are illustrated ten disks (50) representing a one in the tens column. The disks, however, are received in a receptacle in which they can not be further manipulated.

The Bazacos patent discloses a device comprising a display board, supports for hanging numbers, i.e. one through nine, on the board and pegs or other indicia attached to the board, adjacent each support, and representing the number which is to be hung on each support.

The Pratt patent discloses a device comprising a number rack with variously shaped openings, number plates, with corresponding shapes, which can be inserted only in the appropriate recess, and indicia adjacent each opening corresponding in number to the number that is to be received in the recess. This appears to be an "improvement" on the device disclosed in the Bazacos patent.

The Moody patent discloses number cards including dots.

The other patents appear to have only marginal relevance to the present invention.

A series of workbooks published in 1991, entitled NO MEMORIZATION ADDITION AND SUBTRACTION, disclose several techniques for adding and subtracting numbers. One of the workbooks, entitled SUBTRACTION WORKBOOK 2, discloses printed digits, i.e., whole numbers from one to nine, with a corresponding number of dots on the printed digit. This workbook also discloses the use of toothpicks to represent the value of a digit in the one's place and of ten bundled toothpicks to represent the value of a digit in the ten's place.

There are many math resources that are available to assist teachers in teaching students. Math manipulatives are generally known and can comprise tiles, blocks, measuring devices and the like which give students hands-on learning opportunities. Some currently available math resources are discussed in a catalog called "Summit Learning" for Spring, 1996.

Despite the abundance of mathematics teaching and learning materials and methods, there remains a need for a simple, effective and versatile method for teaching and learning basic and advanced math skills.

SUMMARY OF THE INVENTION

The present invention involves the use of digits with markers (which may be printed on cards as in the accompanying kit) and attribute tags. These represent quantities and facilitate mathematical manipulation and problem solving. The given number of markers per digit corresponds to the value of the digit. For example, the digit three is enhanced with three markers. The attribute tags are also provided with a given number of markers, for example, ten markers per attribute tag for math problems in base ten mathematics. An example of an attribute's use would be digit three in the tens column which would have an attribute tag positioned on each of its three markers making a total of thirty markers (in base ten mathematics). The digits and the attributes are then used to represent and solve math problems, for example, subtraction of two digit numbers. If the solution of the problem does not require regrouping, for example twenty eight minus thirteen, digit two and digit eight are arranged to represent the number twenty eight and one attribute tag (consisting of ten markers for base ten mathematics) is positioned on each marker of digit two in the tens place of the number twenty eight. To solve the problem, three of the eight markers in the ones place digit eight are then at least partially obliterated or crossed out and ten of the twenty markers in the tens column digit two are at least partially obliterated or crossed out. The remaining number of markers represents the solution to the problem. If the solution of the problem requires regrouping (borrowing from the tens place to the ones place), for example, thirty two minus nineteen, the digits are arranged to represent the numbers thirty two and nineteen (nineteen being displayed in order to represent an optional subtraction technique). One attribute tag is positioned on each marker of the digit three in the tens place of the number thirty two and one attribute tag is positioned on the marker of the digit one in the tens place of the number nineteen (each two digit number will have a number of markers corresponding with the value of the number). Regrouping is effected by removing one of the attribute tags and the underlying marker from the digit three in the tens place of the number thirty two and positioning it in the ones place or column. As a result of this manipulation, the problem can be easily solved by obliterating as by an X, or by superimposing the negative markers and negative attribute tags over the positive markers and positive attribute tags, then obliterating. This can be expanded to three digit problems by using ten attribute tags with ten markers each and placing a bundle of such attribute tags on each marker on each digit in the hundreds place. It can further be expanded even to thousands place by using a hundred attribute tags with ten markers each and placing this bundle on each marker of each digit in the thousands place.

Addition problems which require regrouping are approached in a similar fashion in that groups of ten markers from the ones column can be collected as by circling or the like and tallied and also be physically moved to the tens column. This can be expanded to tens and hundreds columns by collecting and tallying attribute tags as opposed to collecting and tallying individual markers. Problems involving exponents can be represented and solved with digits which are preferably provided in large and small sizes. For example, three squared is represented by placing a small digit three (having three markers) on each of the three markers of a large digit three with the result that there will be a total of nine markers. Three cubed is represented by placing the preconstructed three squared digits on a preferably larger digit three, one preconstructed three squared digit at each point on the larger digit three where a marker would normally be represented. This can be continued to digit three to the fourth power.

Multiplication problems are also readily represented and solved according to the method of the present invention. For example, eleven times two can be represented by selecting two large digit ones and placing a large attribute tag on the marker of large digit one of the tens place. Eleven digit twos, preferably small twos (one digit two with its two accompanying markers) are then placed on each marker of the large attribute tag of large digit one of the tens column and the marker of large digit one of the ones column. This produces a number eleven with twenty two markers. The problem can also be shown with two smaller elevens (each having a smaller attribute tag) placed on each marker of a large digit two. Division problems are represented and solved according to the present invention by using digits, and attribute tags if necessary, to represent the dividend. Markers on the dividend are then grouped, as by circling or the like, in groups equal to the divisor. Alternatively, the dividend can be cut or separated into pieces, each containing a number of markers equal to the divisor. The quotient is arrived at by counting the groups or pieces, and the remainder, if any, corresponds with number of ungrouped or left over markers.

Negative numbers are represented by using markers and attribute tags which are visually distinguishable from markers and attribute tags used for positive numbers. For example, black markers can be used for positive numbers and red markers can be used for negative numbers.

Markers can also be subdivided, for example into fourths, to represent fractions or solve problems involving fractions. Portions of markers can be represented by some means such as superimposing, highlighting or the like. Addition of fractions can be accomplished by taking the superimposed or highlighted marker parts and grouping them together to form full markers or portions of full markers. Subtraction of fractions can be accomplished by highlighting the amount to be subtracted (or the negative portion of markers) by another means, such as highlighting in red. These negative marker parts can then obliterate positive portions of markers by some means such as overlapping and canceling. Portions not obliterated would represent the answer to the subtraction problem. Multiplication of a whole number by a fraction can be accomplished by superimposing or highlighting that fraction amount of whole markers within a whole number thereby leaving any remaining markers not highlighted, or by highlighting that fraction amount within each individual marker thereby leaving any remaining portion of each marker not highlighted. Optionally, highlighted portions of markers are then collected and added. Multiplication of fractions by another fraction is accomplished by taking the existing marker part which is the fraction, dividing it into equal portions, and superimposing or highlighting the representative parts to show the answer. Division of fractions is accomplished by rewriting the problem into a multiplication problem. Multiplication and division of negative fractions just like any other negative number are again accomplished by using markers distinguishable from positive markers such as highlighting in red. Decimals are represented in the same manner as fractions. For example, decimal numbers such as one tenth can be represented by markers in which one tenth of the marker is superimposed or highlighted by some means.

The present invention also contemplates attribute tags assuming various configurations i.e. rectangular strips, curved strips, spirals, zigzags, as well as clumps of sticky markers such as pieces of tape rolled up with the sticky side out. Sticky markers can be stuck on numbers or to each other, for example, in groups of ten, forming the sticky attribute tags.

Accordingly, it is an object of the present invention to provide a unique and simple method for representing numbers and quantities.

It is a further object of the invention to provide a method for manipulating numbers and numerical quantities to facilitate the solution of mathematical problems.

It is yet another object of the present invention to make mathematics easier to understand and to learn.

These and other objects will be apparent to those skilled in this art from the following detailed description and drawing figures.

DETAILED DESCRIPTION OF THE PREFERRED EMBODIMENT

Figure 1:
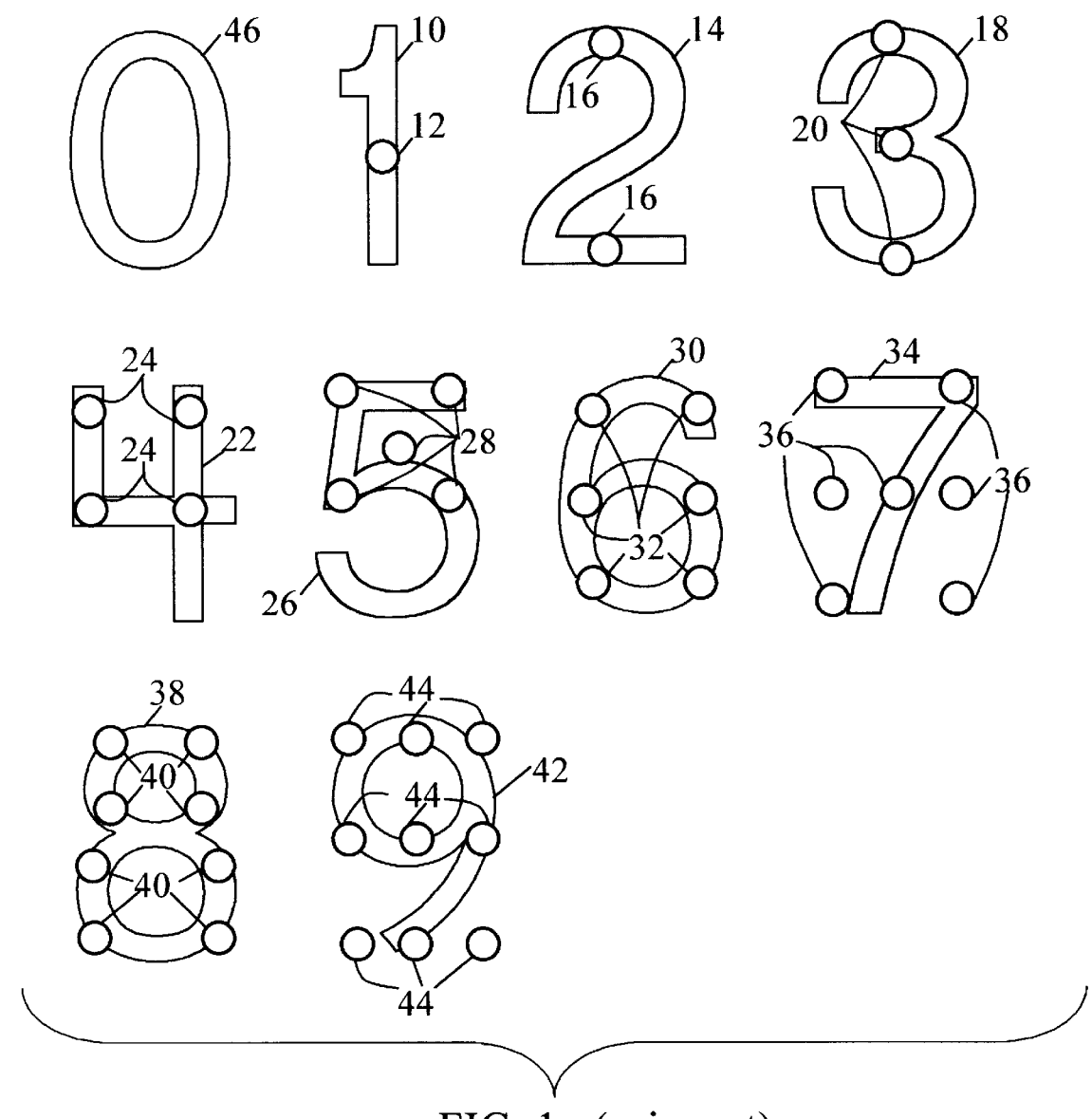
FIG. 1 shows enhanced digits which are useful in practicing the method of the present invention.

Referring now to FIG. 1, a set of prior art digits are illustrated. A digit one 10 includes a marker 12. A digit two 14 includes two markers 16. A digit three 18 includes three markers 20. A digit four 22 includes four markers 24. A digit five 26 includes five markers 28. A digit six 30 includes six markers 32. A digit seven 34 includes seven markers 36. A digit eight 38 includes eight markers 40. A digit nine 42 includes nine markers 44. A zero 46 has no markers. Each digit has a number of markers corresponding with the value of the digit. The position of the markers relative to the digits is not critical, although each marker is shown in a preferred position. Each of the markers 12, 16, 20, 24, 28, 32, 36, 40 and 44 are illustrated as black dots. It will be appreciated that other shapes may be used and some preferred shapes for specific applications are discussed below in more detail.

Figure 2:
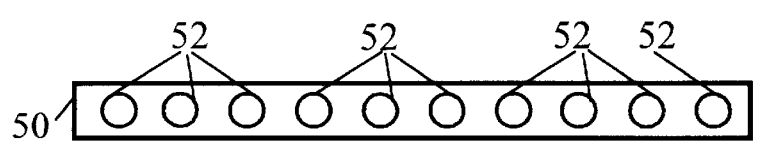
FIG. 2 shows an attribute tag which is used in practicing the method of the present invention.

In FIG. 2, there is illustrated an attribute tag 50. The tag 50 has ten markers 52, again in the form of a black dot. The ten markers 52 on the attribute tag 50 makes it especially suited for use in base ten mathematics. The use of other attribute tags for differently based math is certainly within the scope of the present invention. An attribute tag (not shown) for base eight mathematics, for example, would have eight markers.

Figure 3:
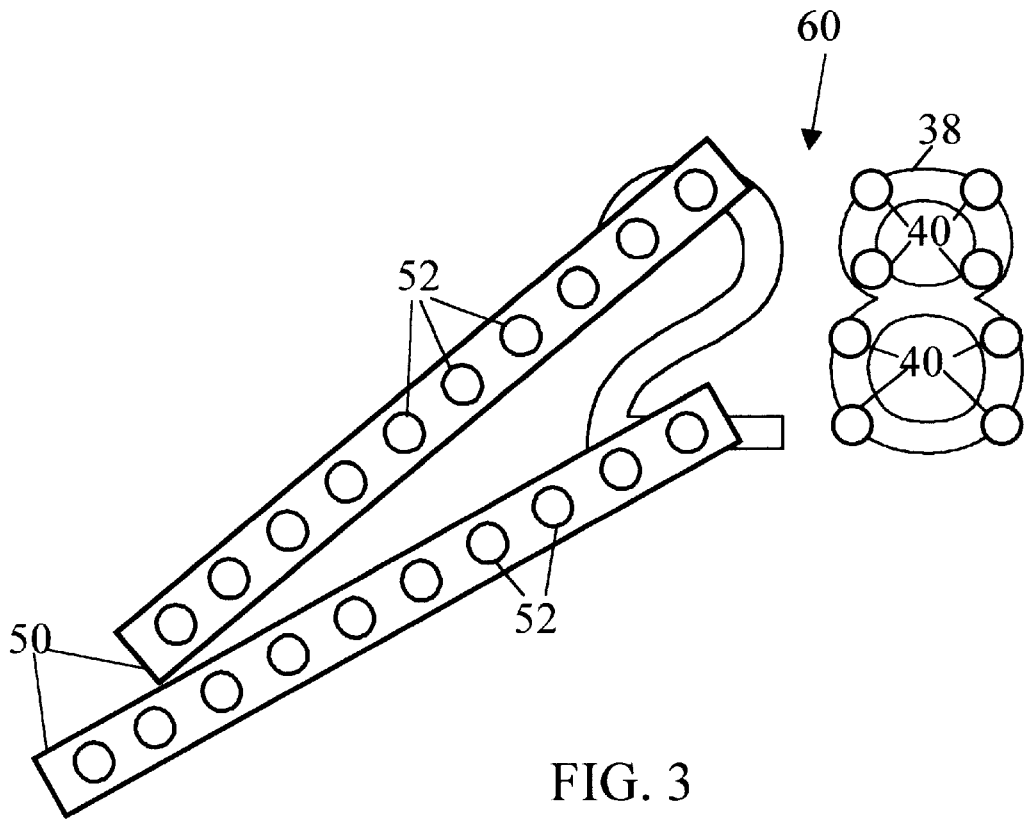
FIG. 3 depicts a step according to the method of the present invention for representing numerical quantities and solving a subtraction problem.
Figure 4:
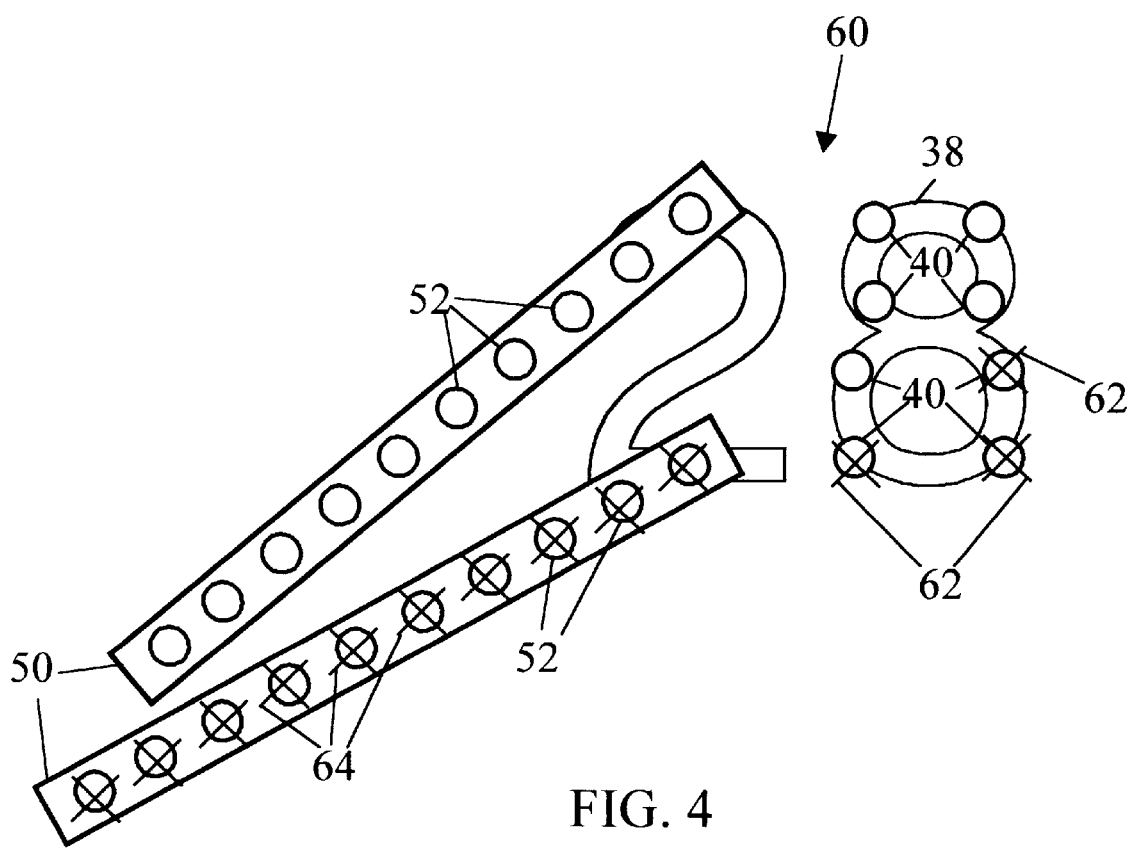
FIG. 4 depicts a further step according to the method of the present invention for representing and solving a subtraction problem.

An example of a subtraction method according to the present invention will now be described with reference to FIG. 3 and FIG. 4. The example involves subtracting the number thirteen from the number twenty eight. According to the method, the digit two 14 and the digit eight 38 are arranged to represent the number twenty eight, indicated generally at 60 in FIG. 3. One attribute tag 50 is positioned on each one of the markers 16 (FIG. 1) on the digit two 14 in the tens place of the number twenty eight. The number twenty eight 60 is now represented so that there are a total of twenty eight markers, twenty markers 52 and eight markers 40. In the next step of the method, three of the eight markers of digit eight 38 in the ones place are then at least partially obliterated or crossed out by marking them with an X 62, or the like (FIG. 4). In the next step, ten of the twenty markers 52 of digit two 14 in the tens column are at least partially obliterated or crossed out by marking them with an X 64. The remaining number of markers 40 of digit eight 38 and 52 of digit two 14 which are not partially obliterated or crossed out represent the solution to the problem twenty eight minus thirteen.

Figure 5:
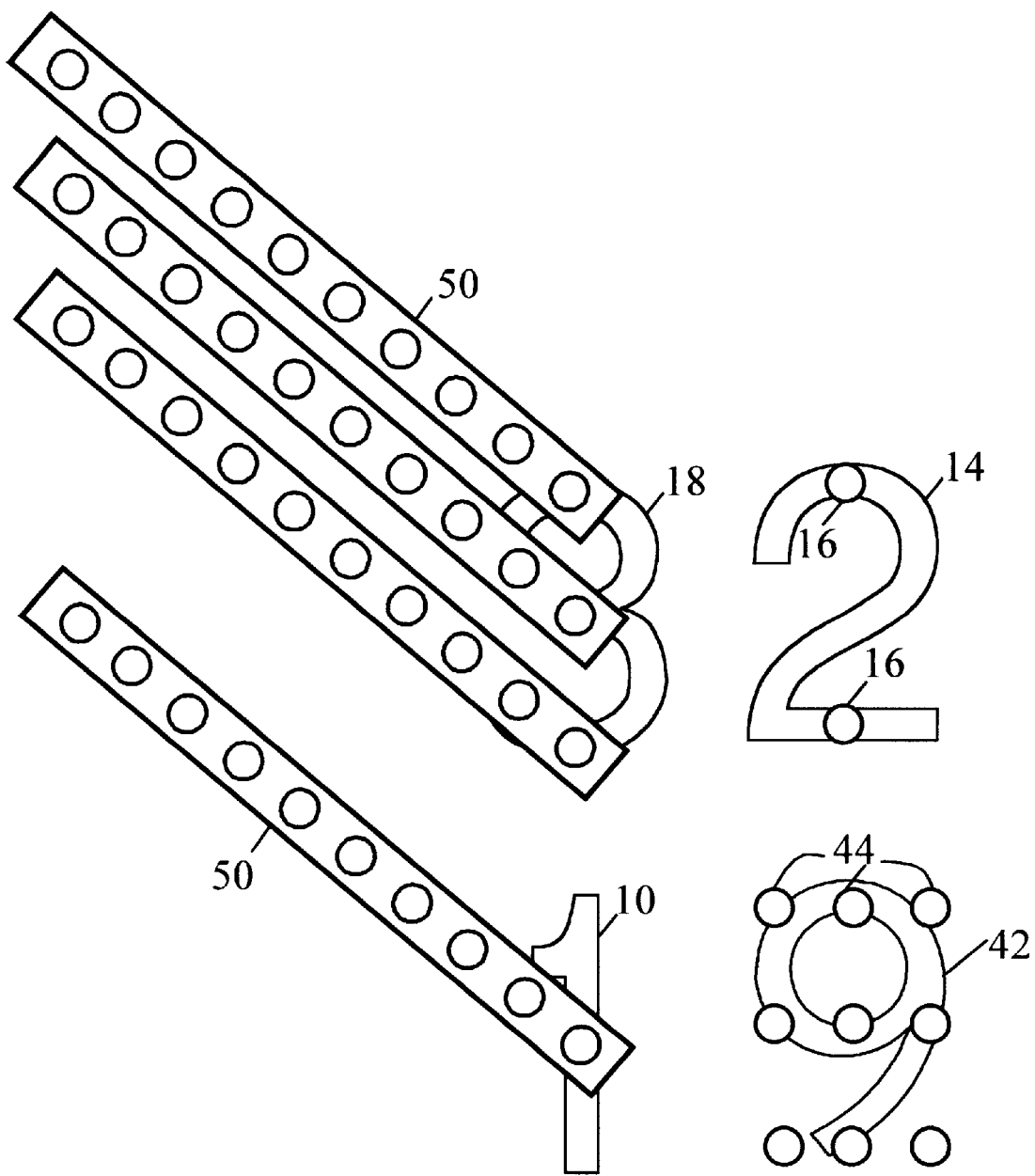
FIG. 5 depicts a step according to the method of the present invention for representing numerical quantities and solving a subtraction problem involving borrowing.
Figure 6:
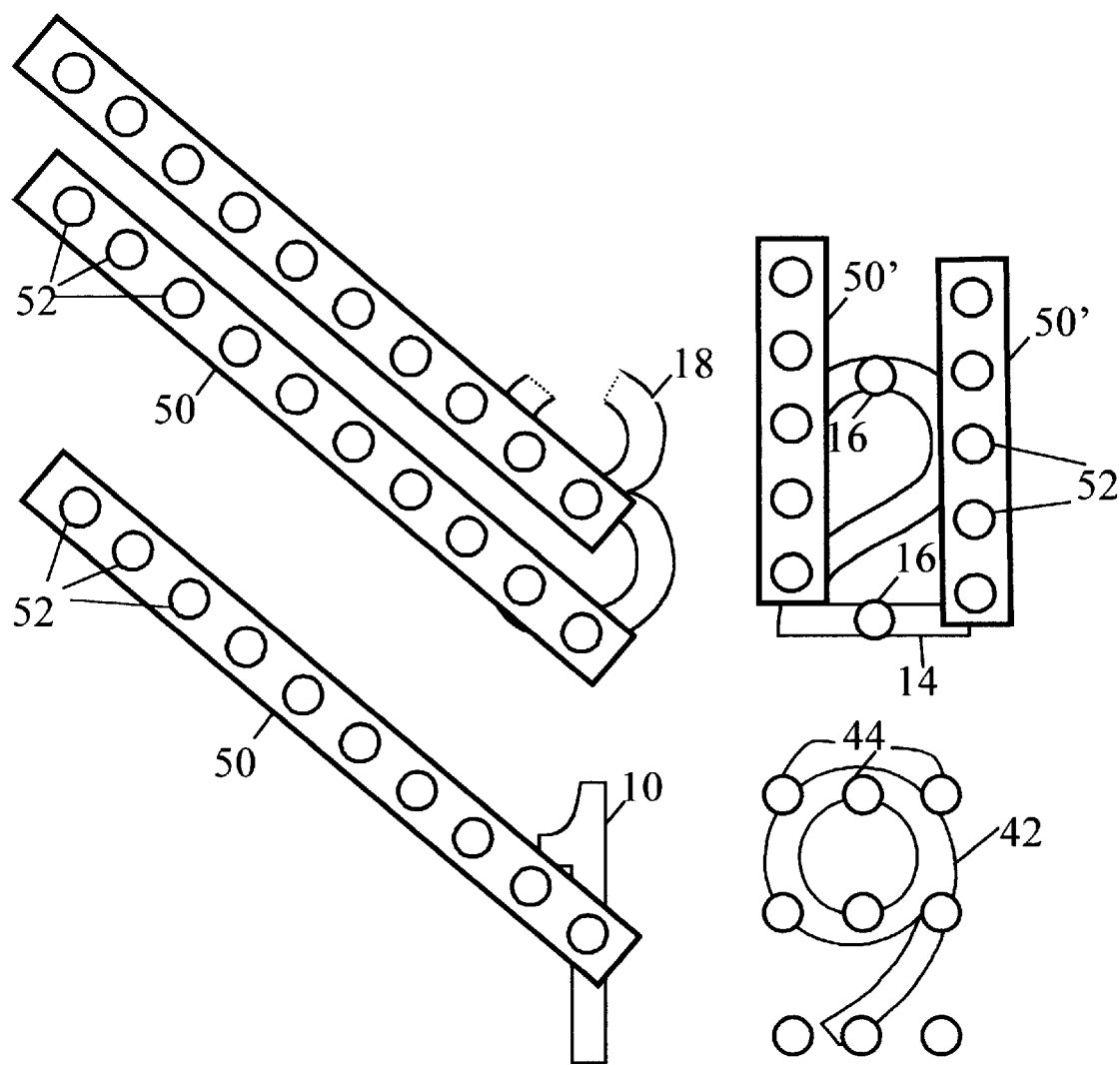
FIG. 6 depicts a further step according to the method of the present invention for representing and solving a subtraction problem involving borrowing.

An example of the steps involved in representing and solving a subtraction problem which requires regrouping (borrowing from the tens place to the ones place), are illustrated in FIG. 5 and FIG. 6. The example involves subtracting nineteen from thirty two. Referring now to FIG. 5, the digits three 18, two 14, one 10 and nine 42 are arranged to represent the numbers thirty two and nineteen (nineteen being displayed in order to represent an optional subtraction technique). One attribute tag 50 is then positioned on each of the markers 20 on the digit three 18 in the tens place of the number thirty two and one attribute tag 50 is positioned on the marker 12 on the digit one 10 in the tens place of the number nineteen. As shown in FIG. 5, as a result, each two digit number has a number of markers corresponding with the value of the number. Regrouping is effected by removing one of the attribute tags 50 and the underlying marker 20 from the digit three 18 in the tens place of the number thirty two and positioning the attribute tag 50 in the ones column, as shown in FIG. 6. The tag 50 can remain complete or it can be cut into pieces 50' or into individual markers. As a result of this manipulation, the problem can be easily solved.

Figure 7:
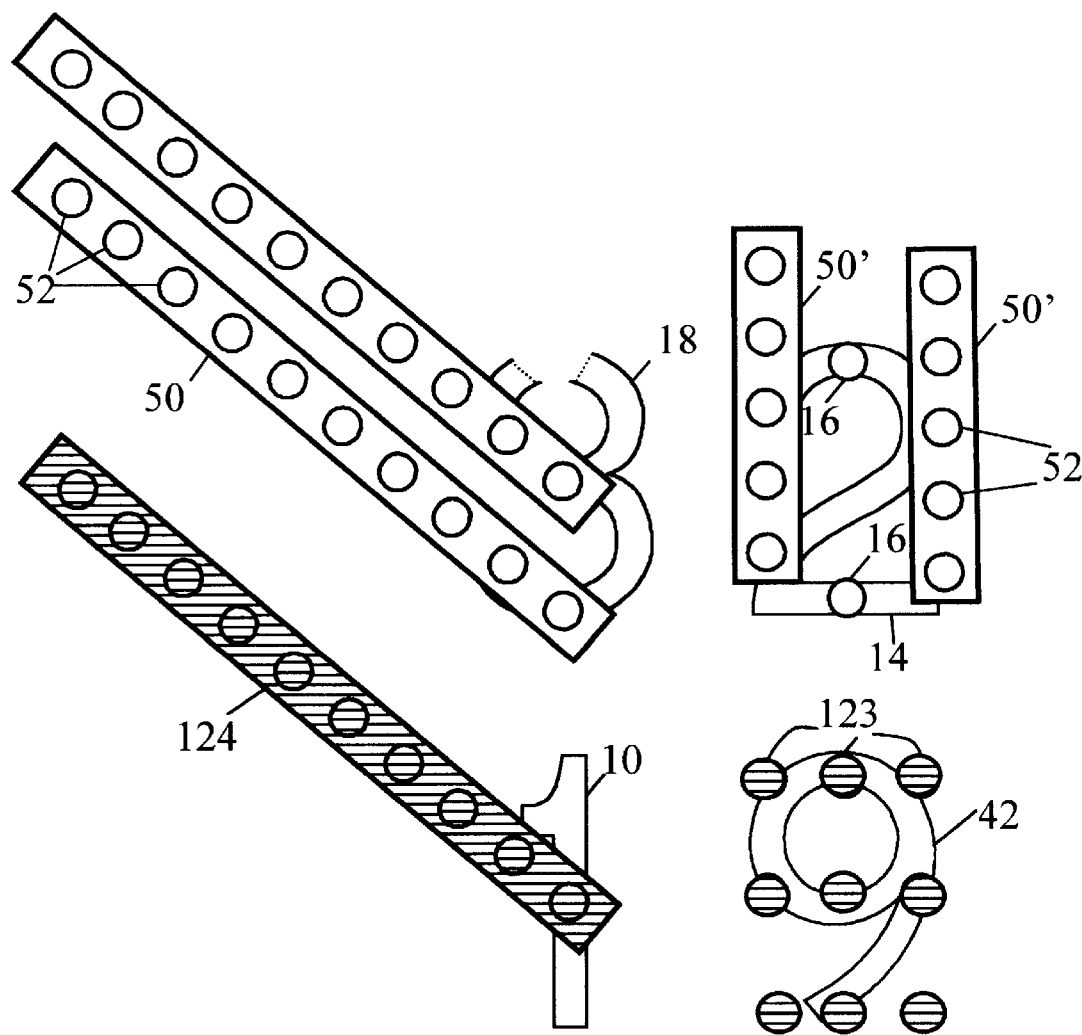
FIG. 7 depicts a step according to the method of the present invention that is an alternative subtraction technique using negative numbers.
Figure 8:
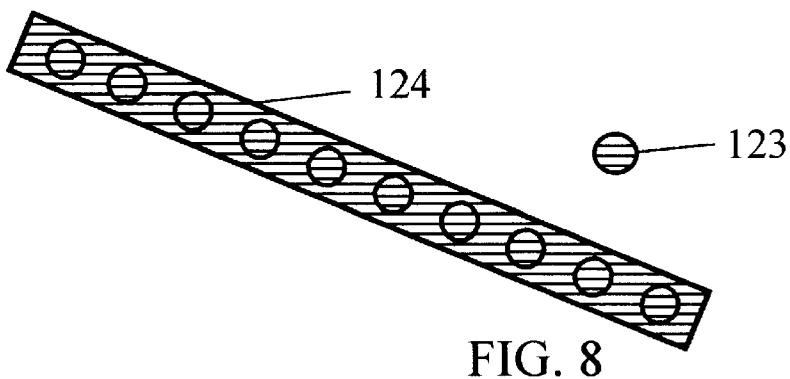
FIG. 8 depicts a method of representing negative markers and negative attribute tags.
Figure 9:
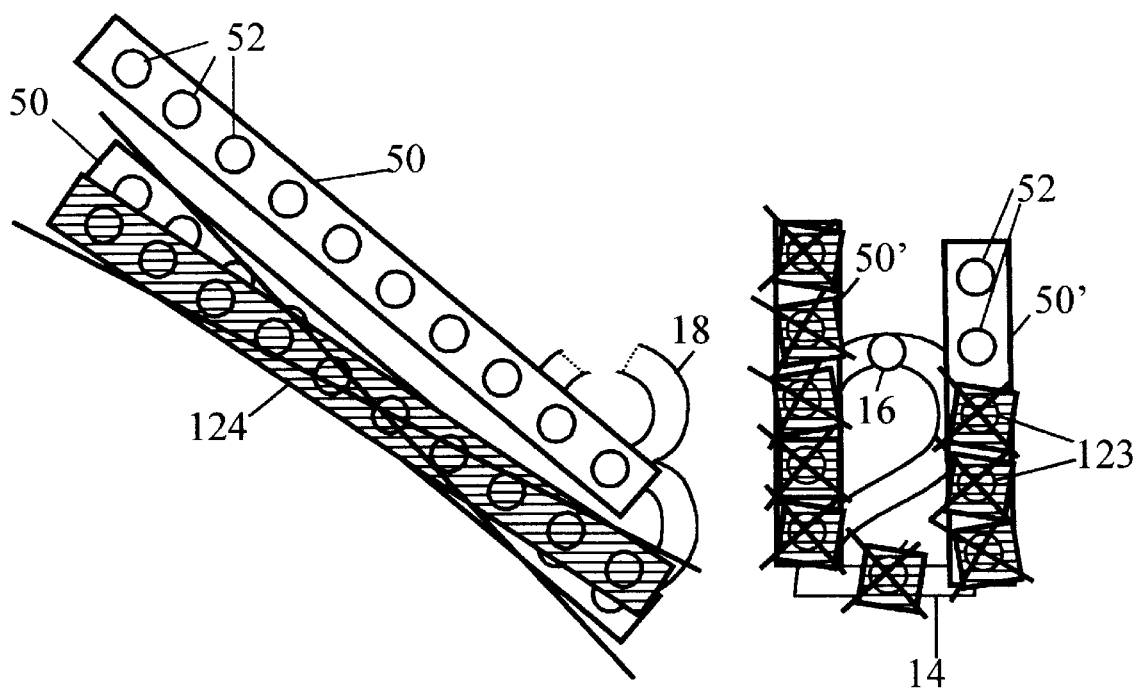
FIG. 9 depicts a further step according to the method of the present invention that is an alternative subtraction technique using negative numbers.

Another technique of obliterating markers in a subtraction problem is by the use of negative numbers. In FIG. 7, markers 123 on digit nine 42 in the ones column and attribute tag 124 on digit one 10 in the tens column are highlighted as indicated generally by shading (or other visually perceptible way) in FIG. 8 to differentiate them as negative markers 123, negative attribute tags 124, and negative numbers. FIG. 9 illustrates the use of negative markers 123 from digit nine 42 in the ones column to obliterate markers 16 and 52 on digit two 14 in the ones column. Correspondingly in the tens column, negative attribute tag 124 is removed from digit one 10 of the tens column and is used to obliterate an attribute tag 50 on digit three 18 in the tens column. The remaining markers, i.e., the ones not obliterated by the negative markers and negative attribute tags, represent the answer to the subtraction problem.

Figure 10:
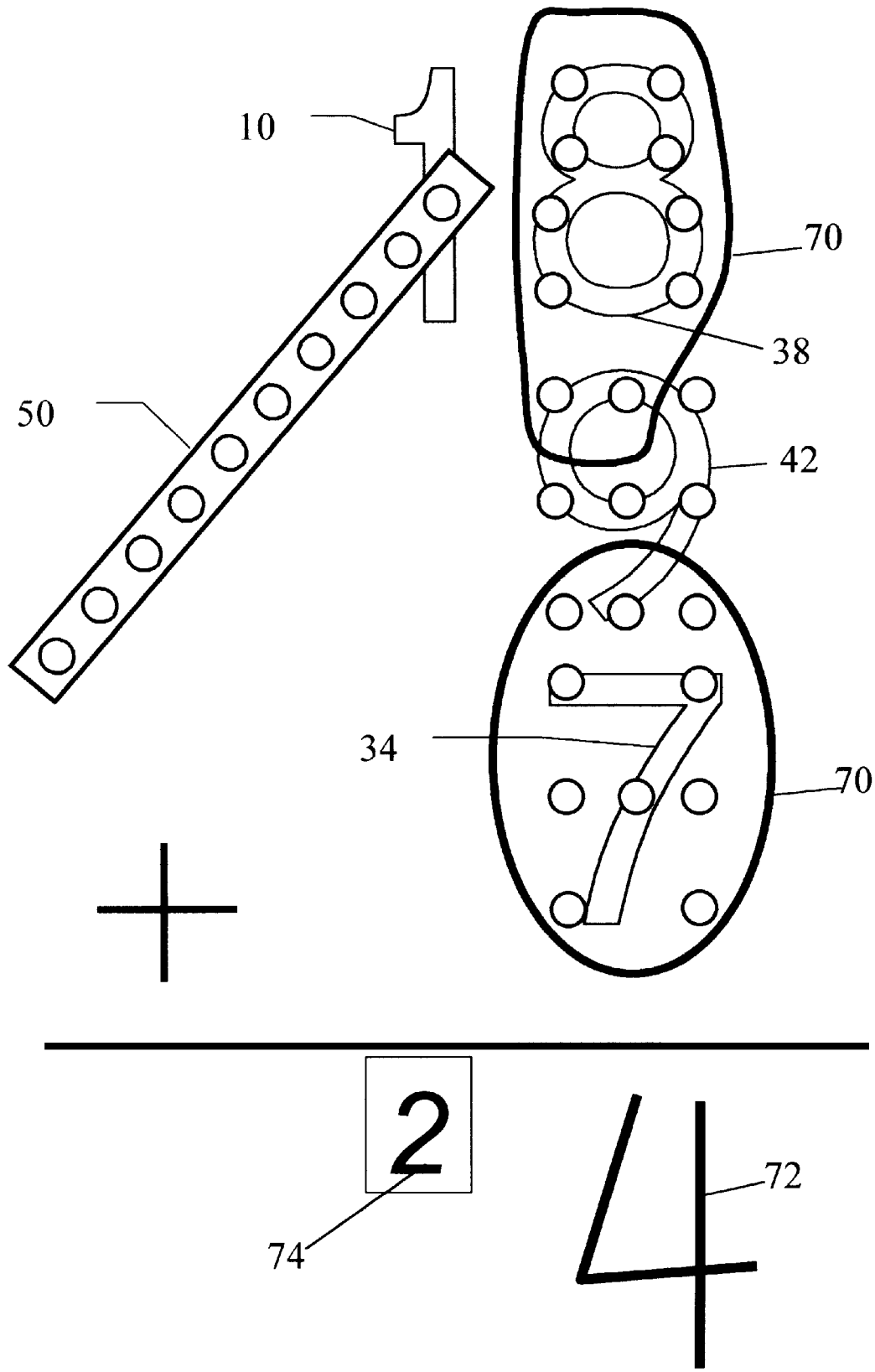
FIG. 10 illustrates a method of the present invention for representing numerical quantities and solving addition problems.

An example of the steps involved in representing and solving an addition problem according to the method of the invention is illustrated in FIG. 10. The digits one 10, eight 38, nine 42 and seven 34 are arranged as shown to represent the problem eighteen plus nine plus seven. An attribute tag 50 is positioned on the marker 12 of the digit one 10. Circles 70 are drawn around groups of ten markers in the ones column. This leaves four uncircled markers and the digit number four 72 is written below the ones column. The two groups of circled markers are counted and the digit number two 74 is recorded. Grouped markers may also be removed from the ones column and physically placed at the top of the tens column (not shown). It is also recognized that attribute tags can be grouped and tallied in the tens column just as individual markers are grouped and tallied in the ones column (not shown).

Figure 11:
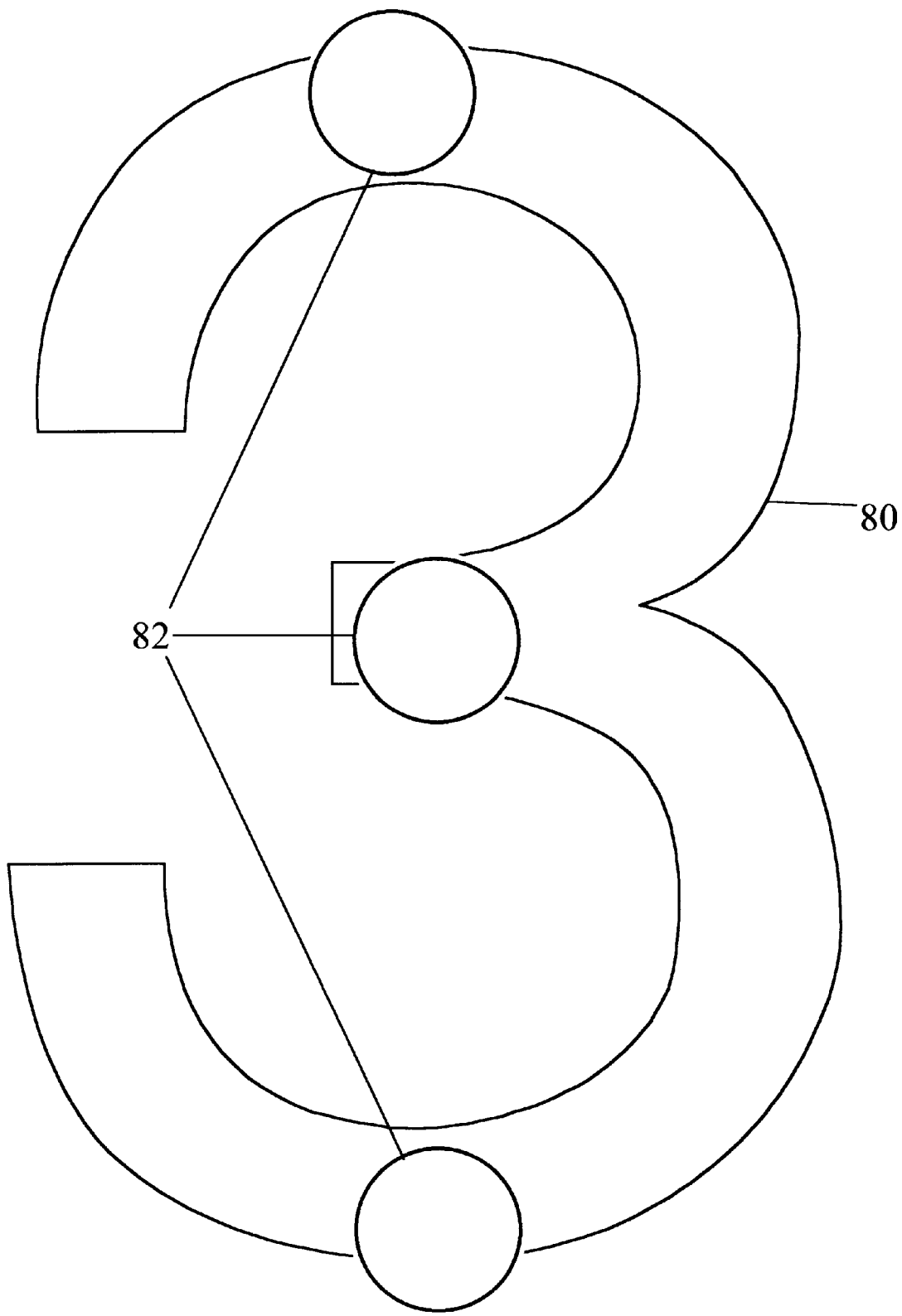
FIG. 11 shows a large enhanced digit three.
Figure 12:
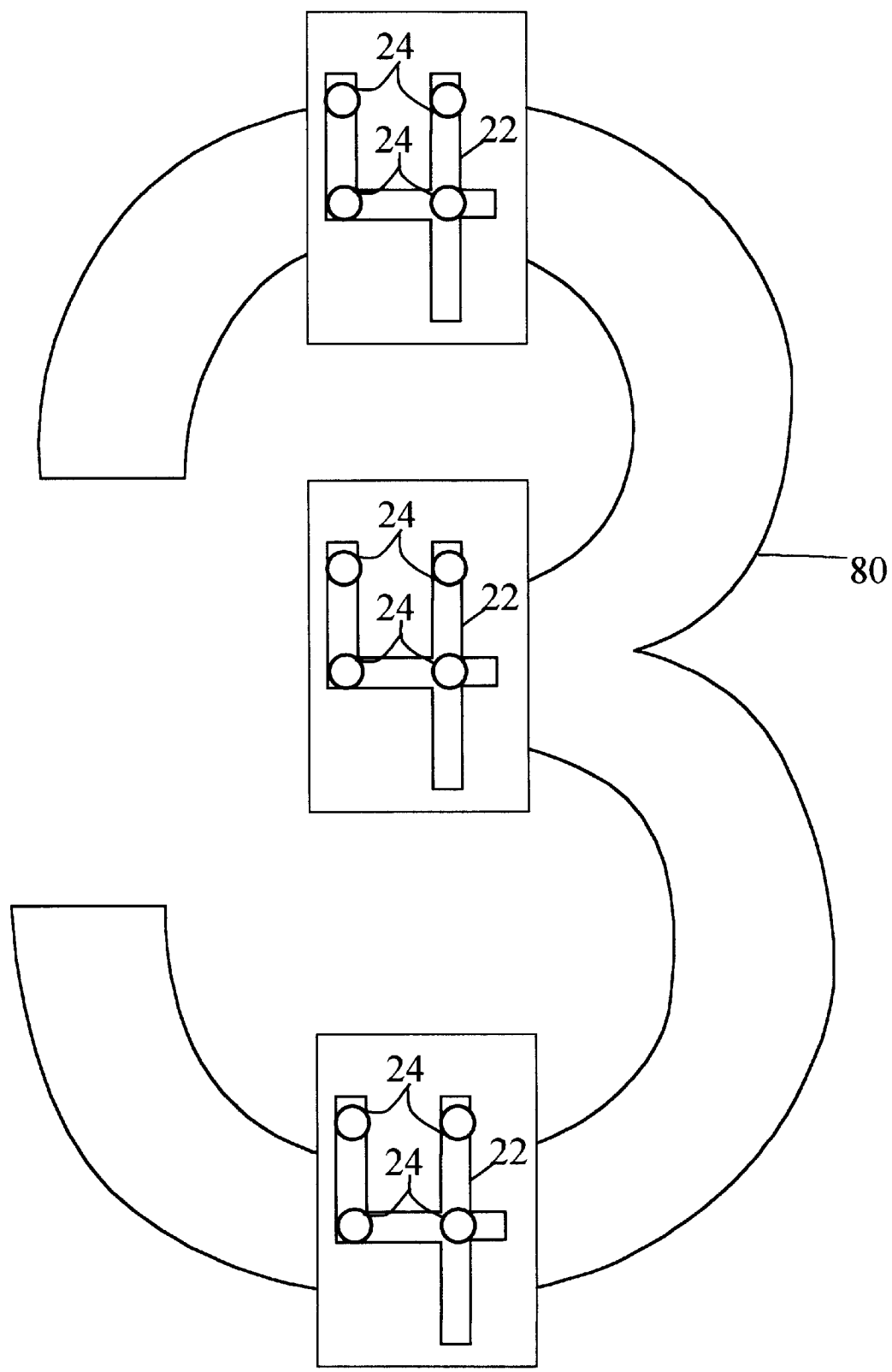
FIG. 12 illustrates a step in a method according to the present invention for representing and solving a multiplication problem.

An example of the steps involved in representing and solving a multiplication problem are illustrated in FIG. 11 and FIG. 12. The problem of this example is three times four. A large digit three 80 is illustrated in FIG. 11. The large digit three 80 has three large markers 82. In the next step, three small digits four 22, each having four small markers 24, are placed on each of the large markers 82 of the large digit three 80, as shown in FIG. 12. The total number of markers 24 equals twelve, the solution to the problem. It will be appreciated, of course, that the problem could have been set up with a large digit four (not shown) and four small digit threes 18.

Figure 13:
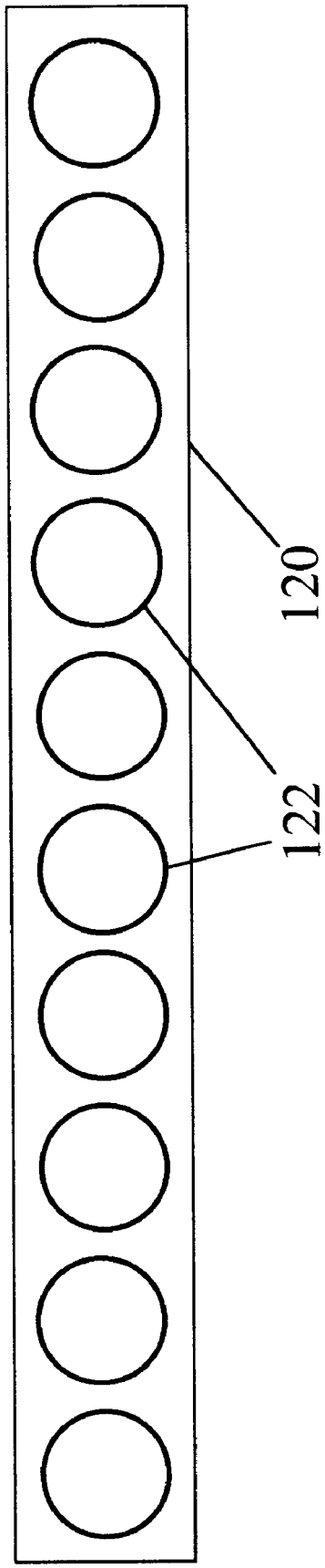
FIG. 13 illustrates a portion of a large attribute tag.
Figure 14:
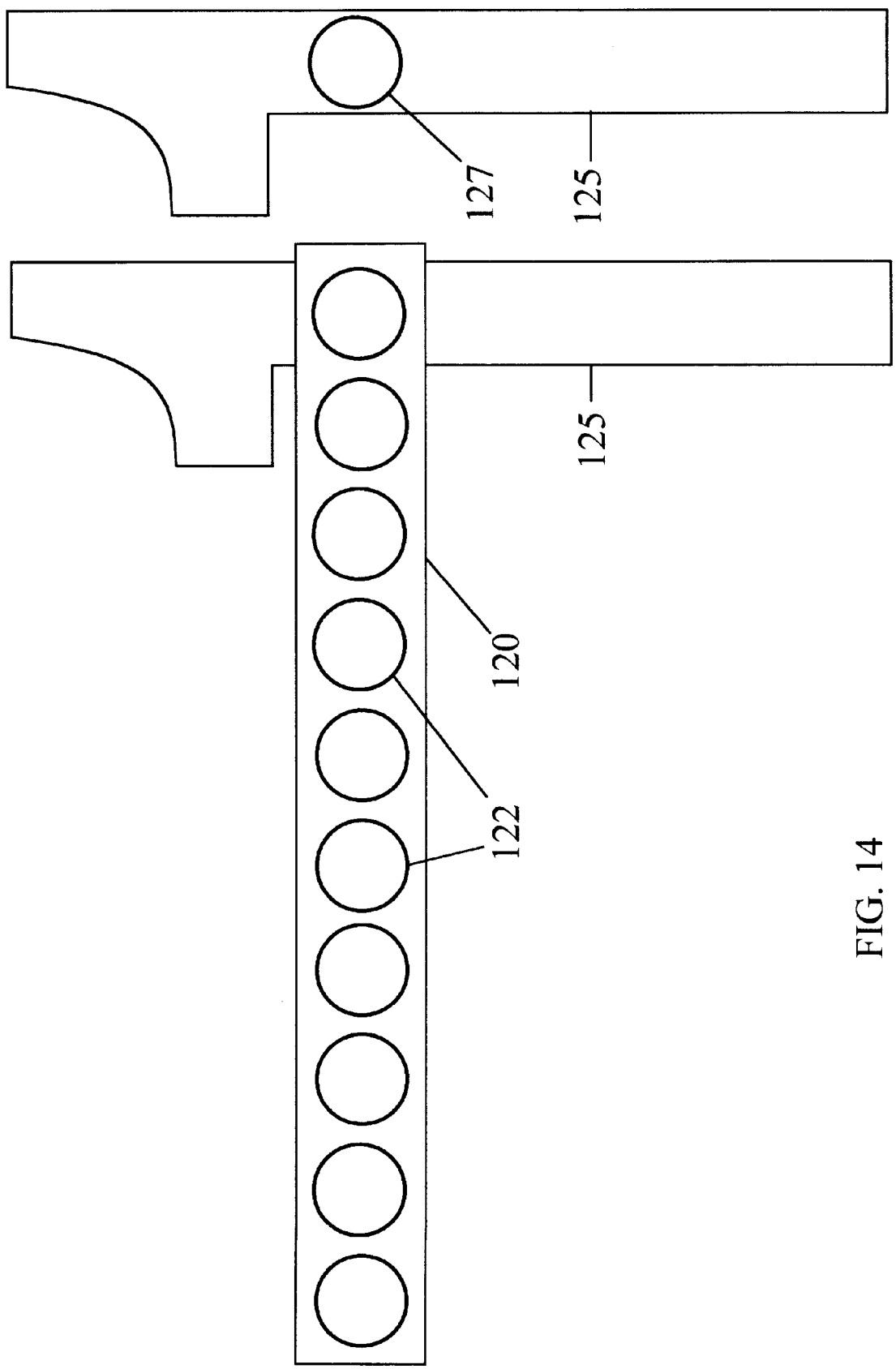
FIG. 14 shows a large enhanced number eleven possessing a large attribute tag.
Figure 15:
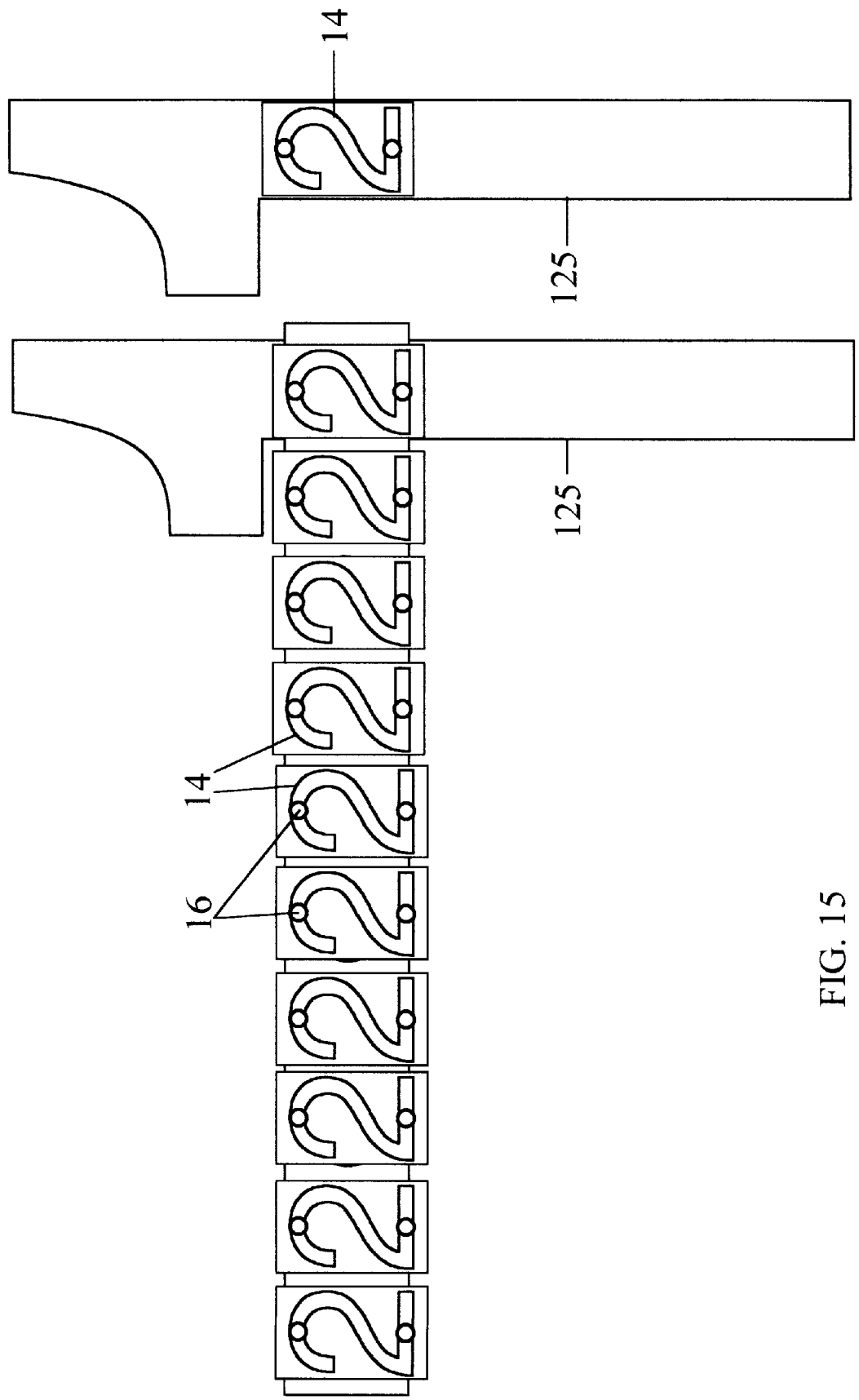
FIG. 15 illustrates a step in a method according to the present invention for representing and solving a multiplication problem where one factor possesses an attribute tag.

In the case of a multiplication problem in which one of the factors has two digits, such as the number 11, it is represented according to the method by two large digits one 125 (FIG. 14) and a large attribute tag 120 (FIG. 13). The multiplication problem two times eleven is represented, as shown in FIG. 15 with a small digit two 14, on each marker 122 of the attribute tag 120 on the large digit one 125 in the tens column as well as on a marker 127 (FIG. 14) on the digit one 125 in the ones column (FIG. 15). The sum total of markers 16 on the digits two 14 in FIG. 15 is equal to the answer, twenty two.

Figure 16:
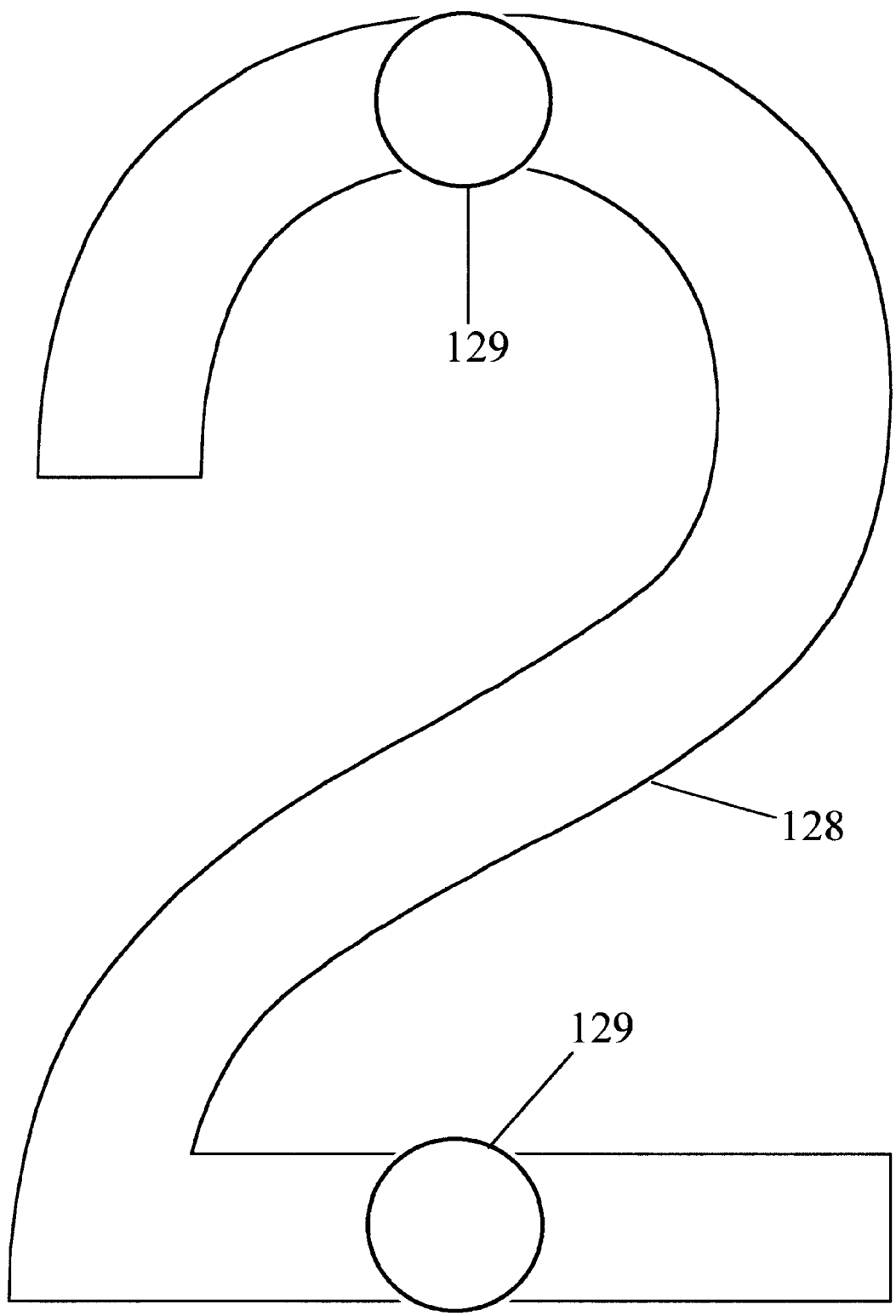
FIG. 16 shows a large enhanced digit two.
Figure 17:
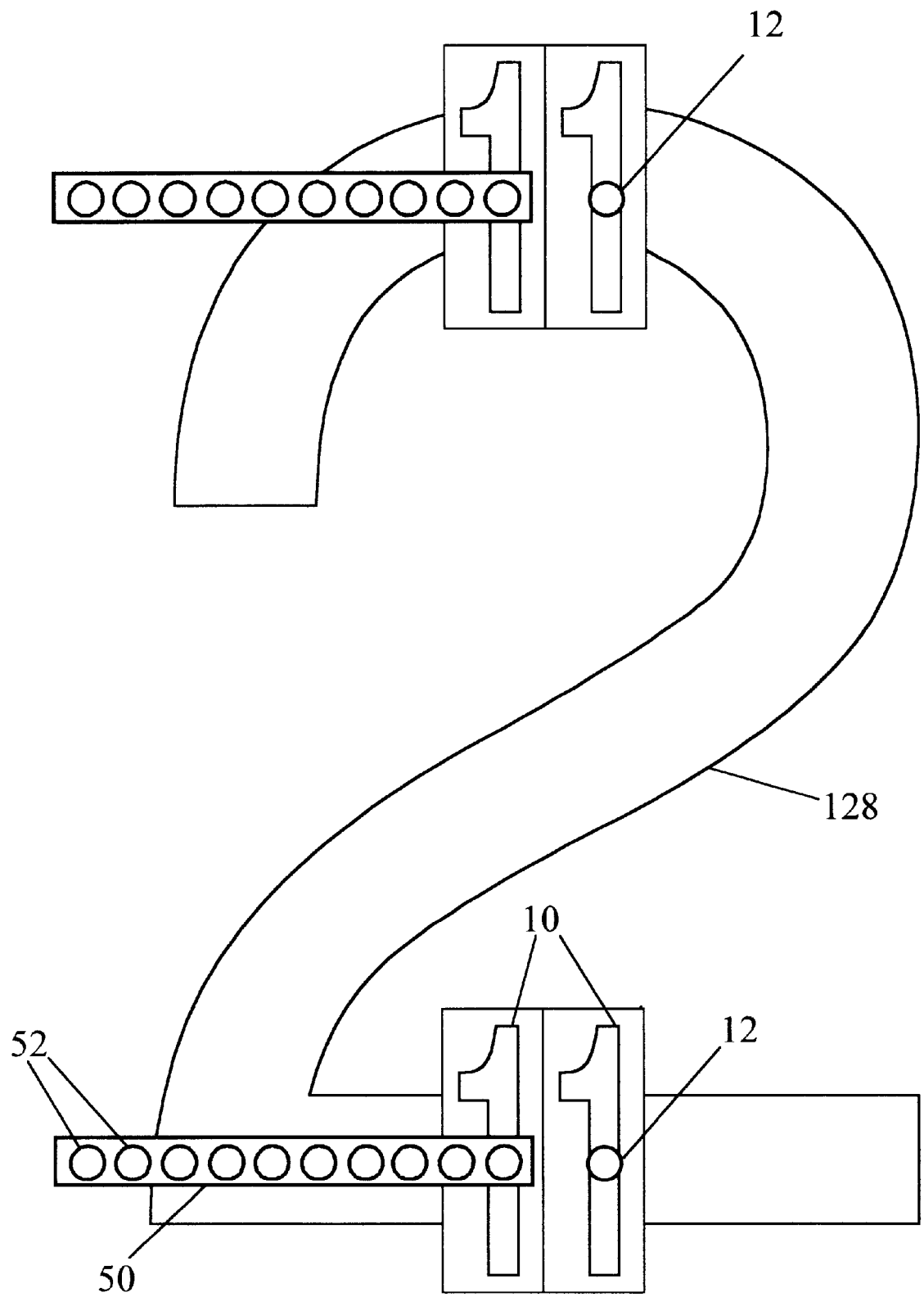
FIG. 17 illustrates a step in a method according to the present invention for representing and solving a multiplication problem where one factor possesses an attribute tag that is an alternative to FIG. 15.

FIG. 16 and FIG. 17 illustrate an alternative method for representing and solving the multiplication problem two times eleven, starting with the factor two represented by a large digit two 128 having large markers 129 (FIG. 16). FIG. 17 shows the markers 129 of the factor two 128 each covered or replaced with the co-factor eleven represented by a tens column digit one 10 with its attribute tag 50 along with ones column digit one 10. Again, the sum total of all of the markers 12 and 52 in FIG. 17 is equal to the answer, twenty two.

Figure 18:
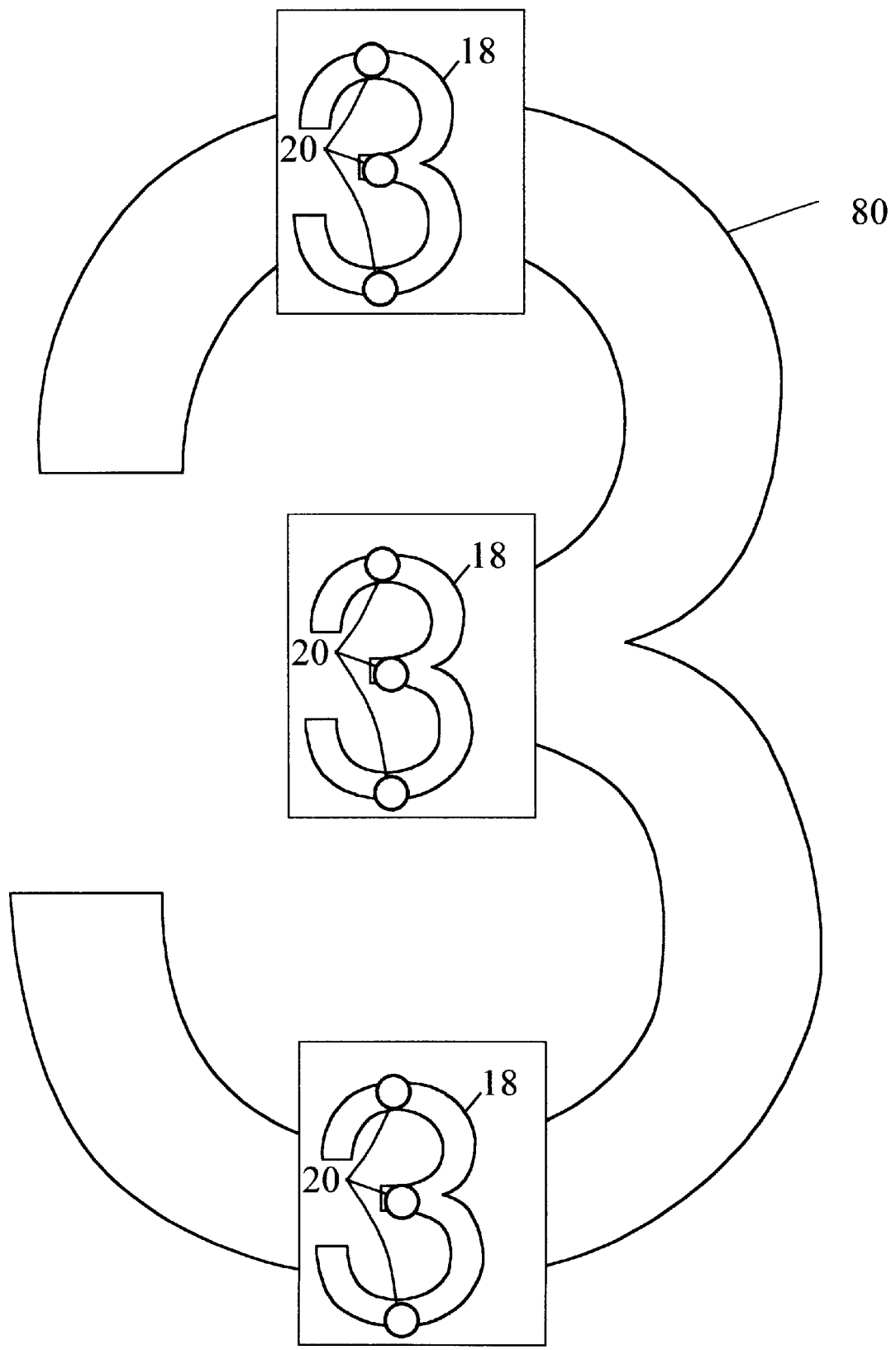
FIG. 18 illustrates a step in a method according to the present invention for representing and solving an exponential problem whereby a number is squared.
Figure 19:
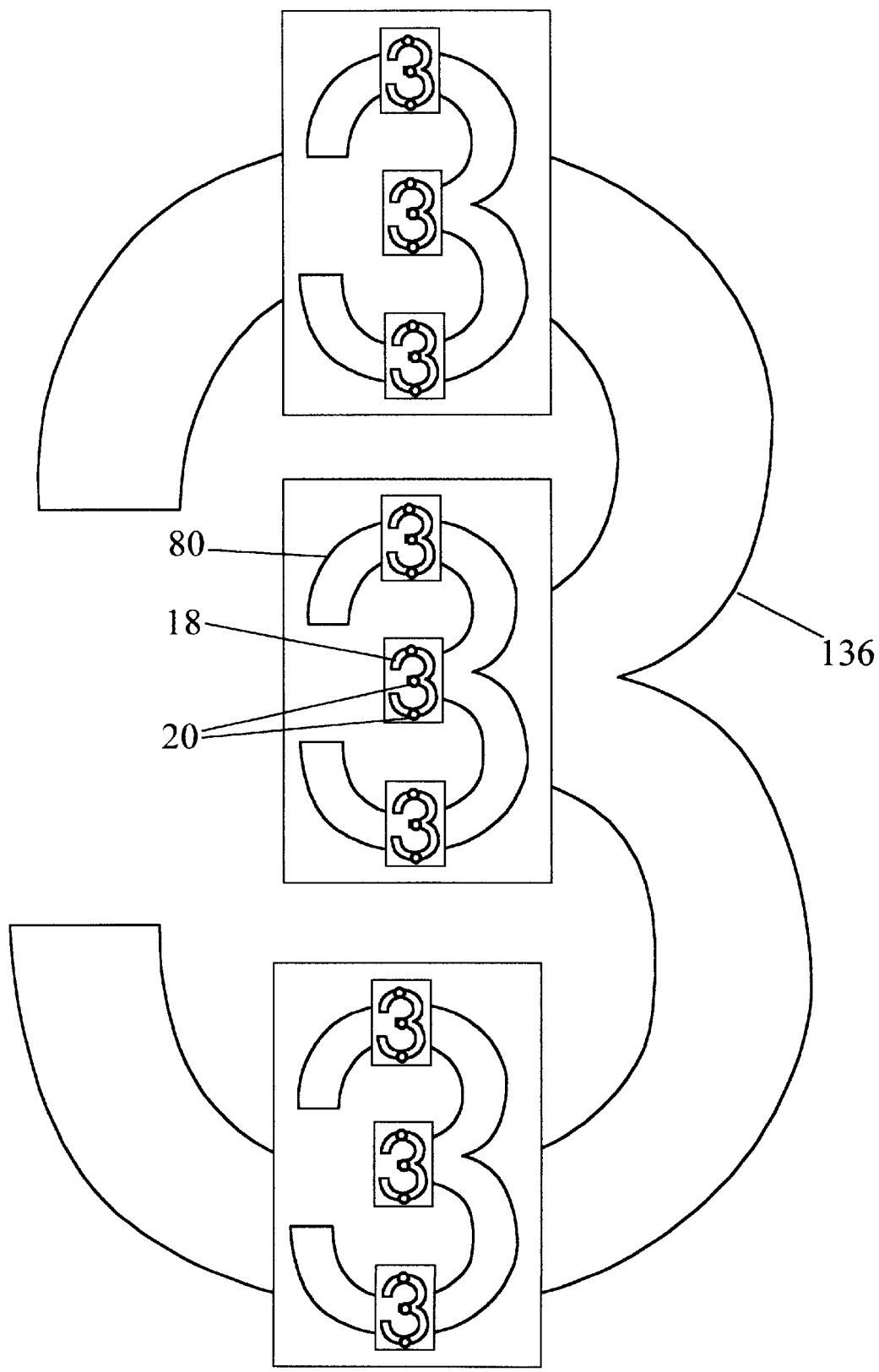
FIG. 19 illustrates a step in a method according to the present invention for representing and solving an exponential problem whereby a number is cubed.

The steps involved in solving an exponential math problem are illustrated in FIG. 18. The problem in this example is three squared or three times three. The large digit three 80 in FIG. 11 has its three markers 82 (FIG. 11) covered or replaced with small digits three 18, each having three markers 20. The total number of markers 20 equals nine, the solution to this problem. With a third, extra large digit three 136 (FIG. 19), it is possible to represent the cubing of a number, as in three cubed, by placing three of the squared large digit threes (FIG. 18) on the marker points (not shown) of the extra large digit three 136. The total number of markers 20 now equals twenty seven, the solution to this problem. This technique can be extended to represent and solve the problem of the number three to the fourth power, although this is not illustrated.

Figure 20:
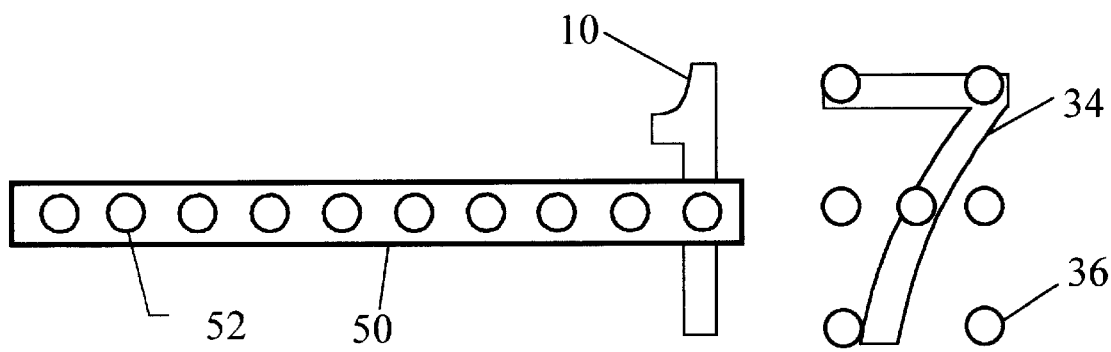
FIG. 20 illustrates the number seventeen.
Figure 21:
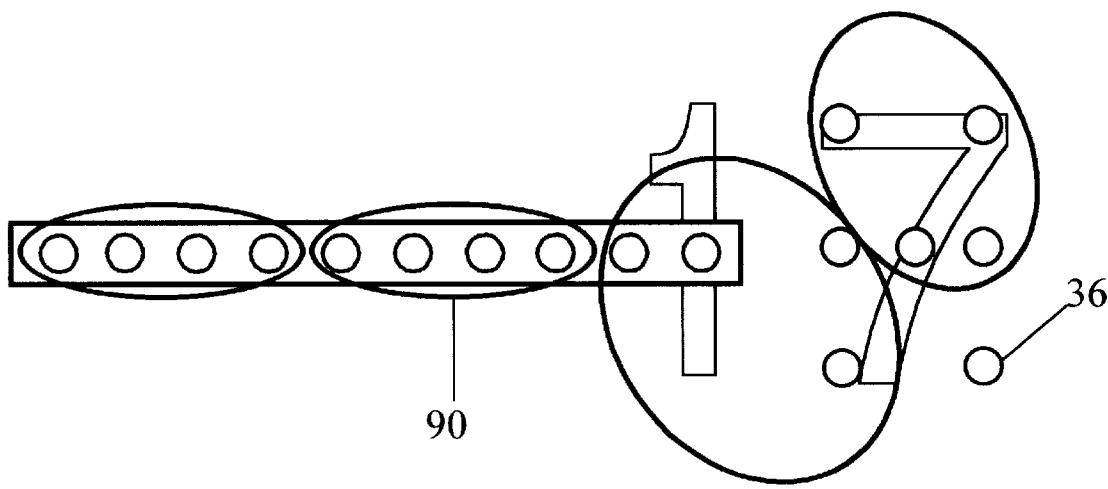
FIG. 21 illustrates the steps involved in representing and solving a division problem according to the method of the present invention.

An example of the steps involved in solving a division math problem are illustrated in FIG. 20 and FIG. 21. The problem in this example is seventeen divided by four. In FIG. 20, the number seventeen, the dividend, is represented by a digit one 10, an attribute tag 50 and a digit seven 34. There are ten attribute tag markers 52 and seven digit markers 36 for a total of seventeen markers. In FIG. 21, circles 90 have been drawn around groups of four markers. There are a total of four circles 90 and there is one uncircled marker 36. The solution to the problem is four, remainder one and this is graphically illustrated in FIG. 21.

Figure 22:
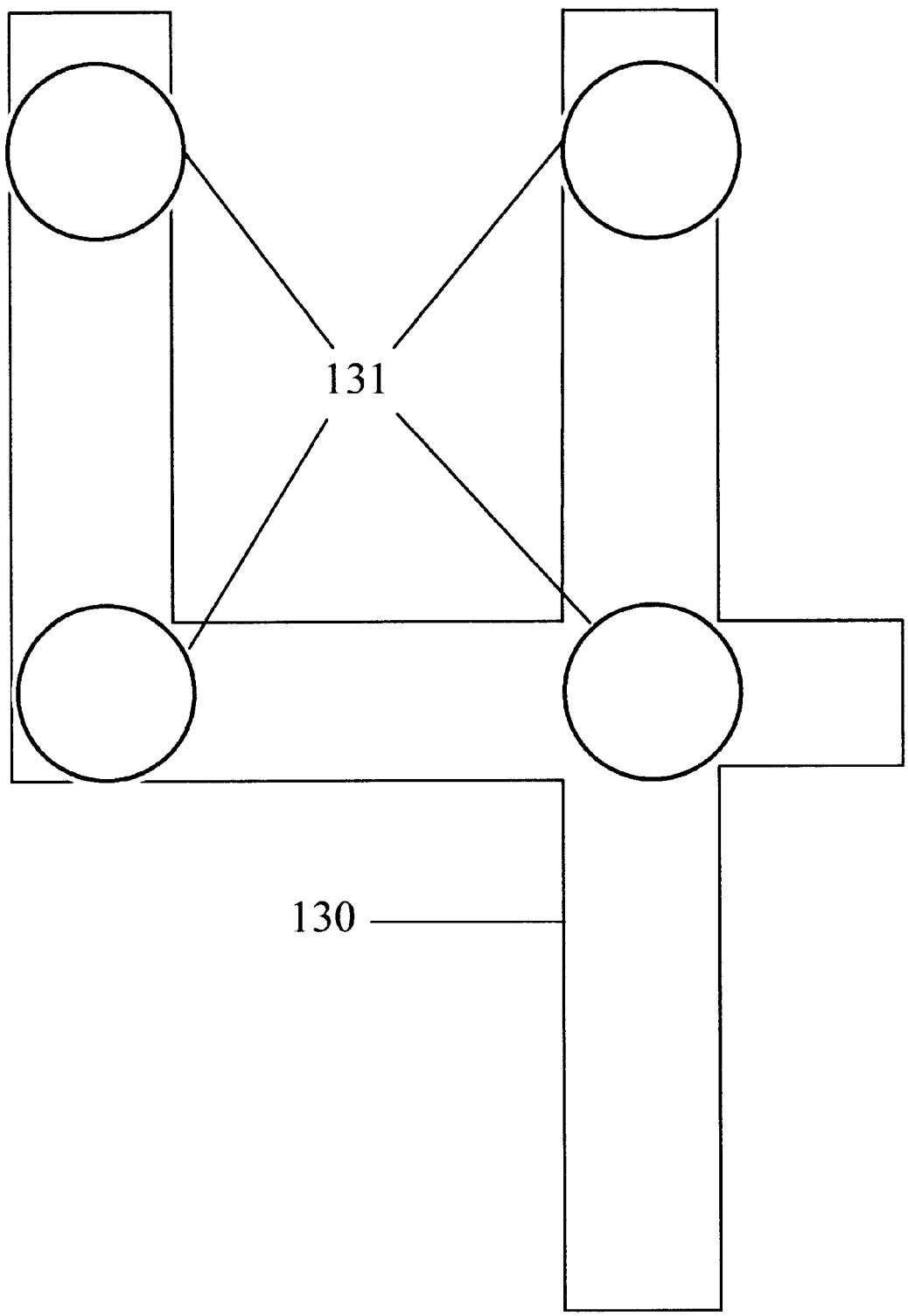
FIG. 22 shows a large enhanced digit four.
Figure 23:
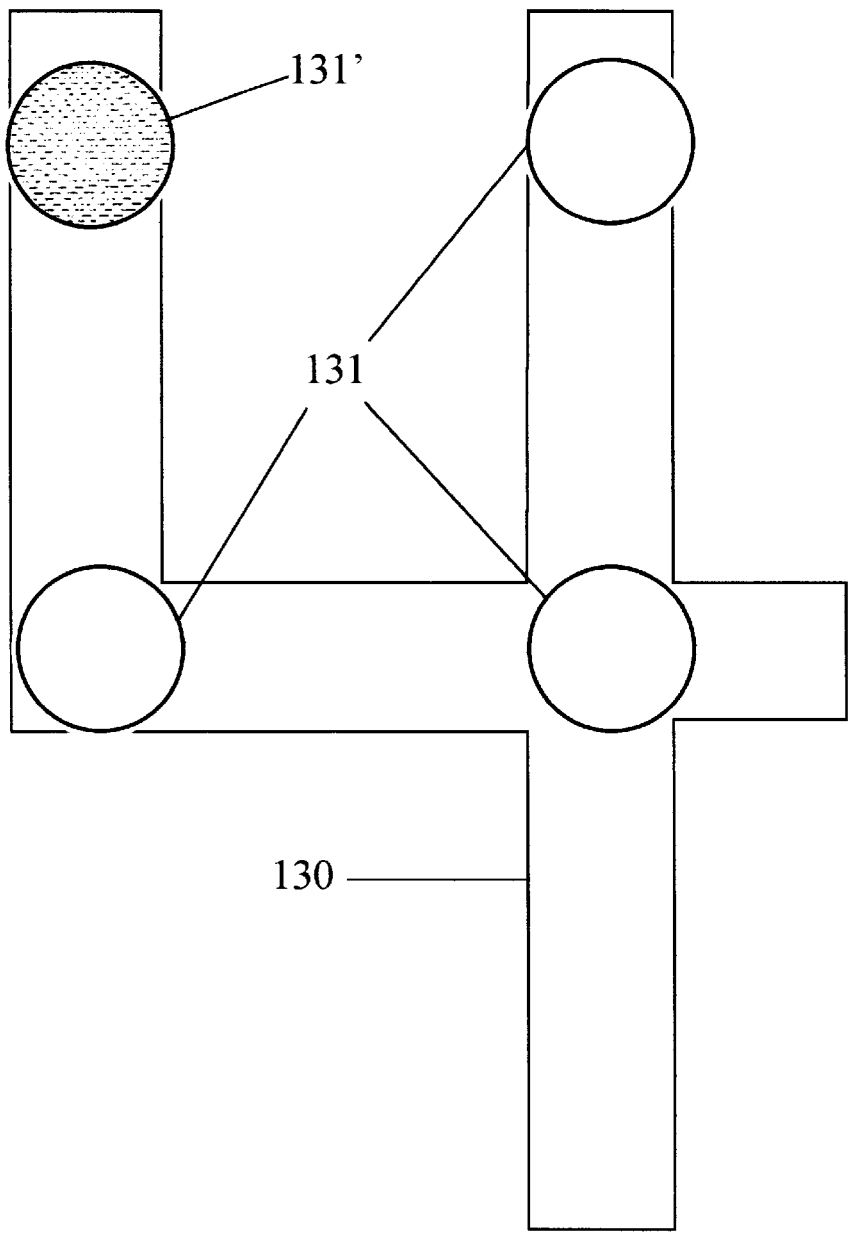
FIG. 23 illustrates a step in a method according to the present invention for representing a fractional part of a whole number.
Figure 24:
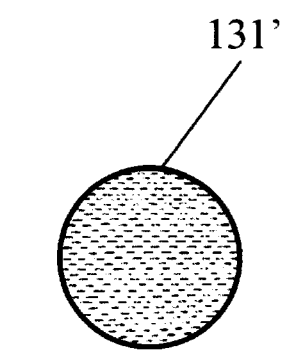
FIG. 24 illustrates a fractional part of a whole number as it stands aside from the number.

Fractions can readily be represented and solved in accordance with this invention by rendering a portion of a marker visually distinct from the rest of the marker, as by some means such as covering, shading, outlining, or the like, a portion of the markers. FIG. 22 shows a large digit four 130 with markers 131. FIG. 23 shows one method of representing the fraction one fourth and the multiplication problem one fourth times four (as well as four divided by four) whereby one marker, designated 131', on the digit four 130, is rendered visually distinct from the other three markers 131. It will be appreciated that this can be accomplished in numerous ways, as by shading a marker 131, covering a marker 131 with a marker 131' or replacing a marker 131 with a marker 131'. FIG. 24 shows the one shaded marker that was formerly marker 131' of digit four 130.

Figure 25:
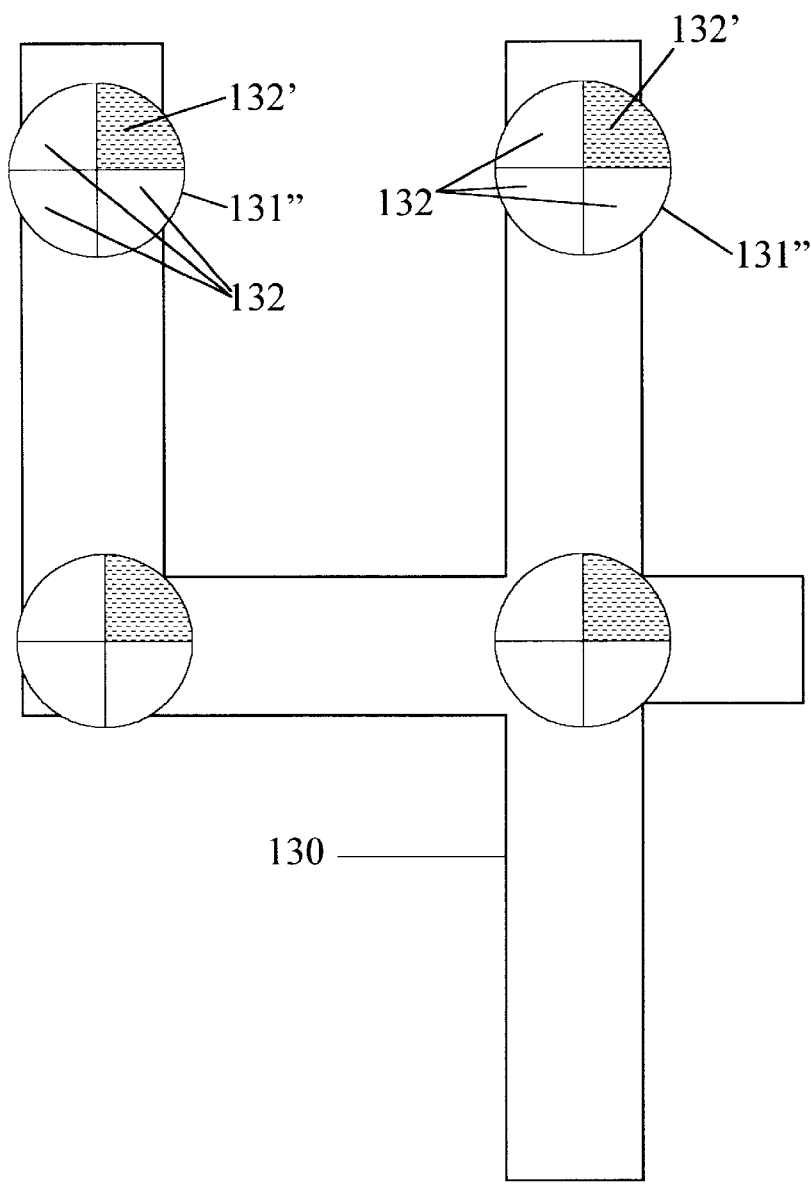
FIG. 25 illustrates a step in a method according to the present invention for representing a fractional part of a whole number which is an alternative to FIG. 23.
Figure 26:
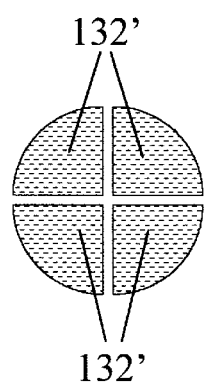
FIG. 26 illustrates fractional parts of a whole number as it stands aside from the number and is combined to show addition of fractions.

FIG. 25 shows another method for representing the fraction one fourth and the multiplication problem one fourth times four (as well as four divided by four) whereby each of four markers 131" on digit four 130 are sectioned into four marker parts, three of which are relatively light and are designated 132 and one of which is dark and is designated 132'. Again, the marker parts 132 and 132' are visually distinct from each other. In FIG. 26, the dark marker parts 132' have been regrouped and organized into a complete marker. FIG. 26 also shows addition of the four shaded or darkened marker parts 132' in the problem one fourth plus one fourth plus one fourth plus one fourth.

Figure 27:
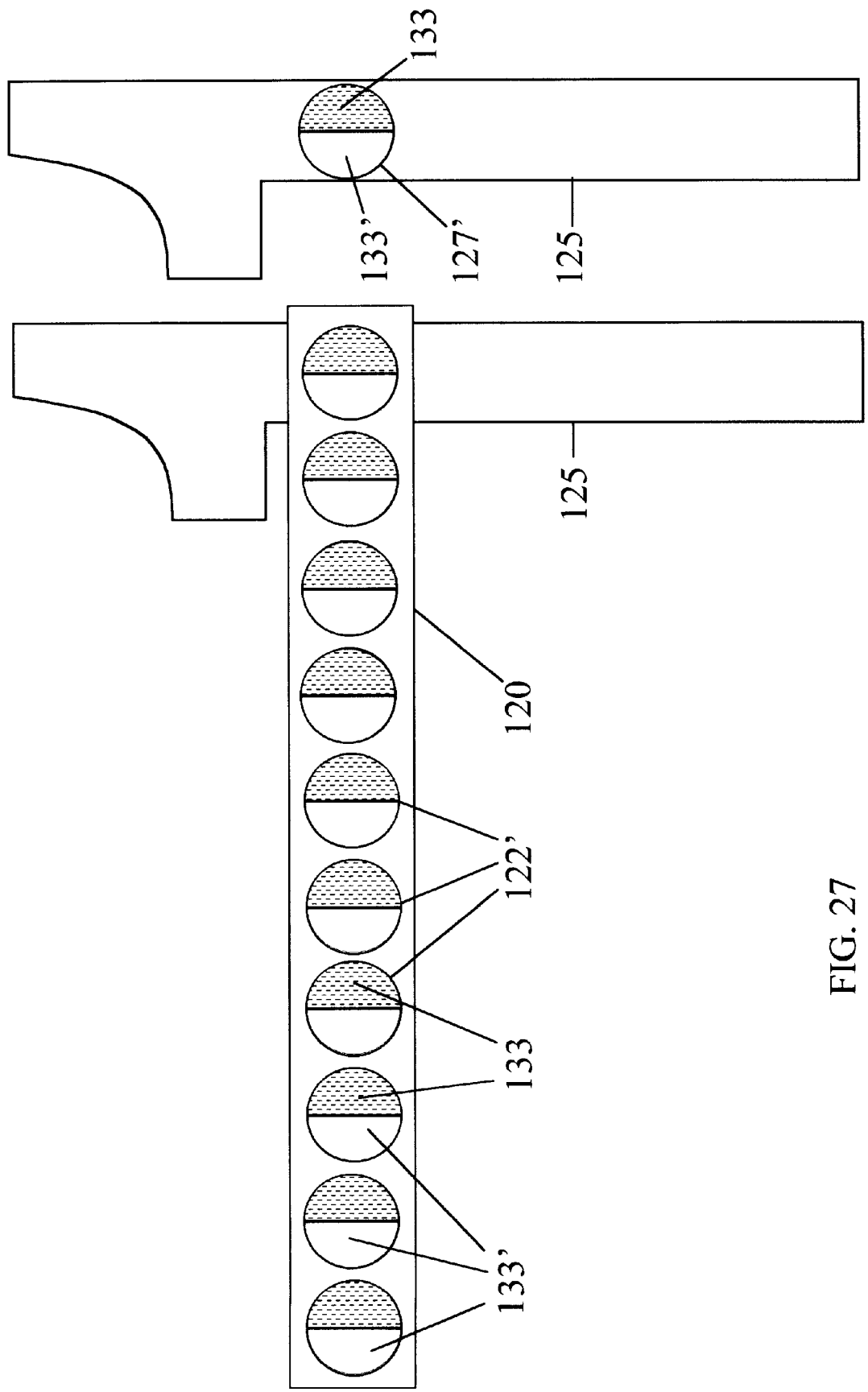
FIG. 27 illustrates a step in a method according to the present invention for representing a fractional part of a whole number which possesses an attribute tag.
Figure 28:
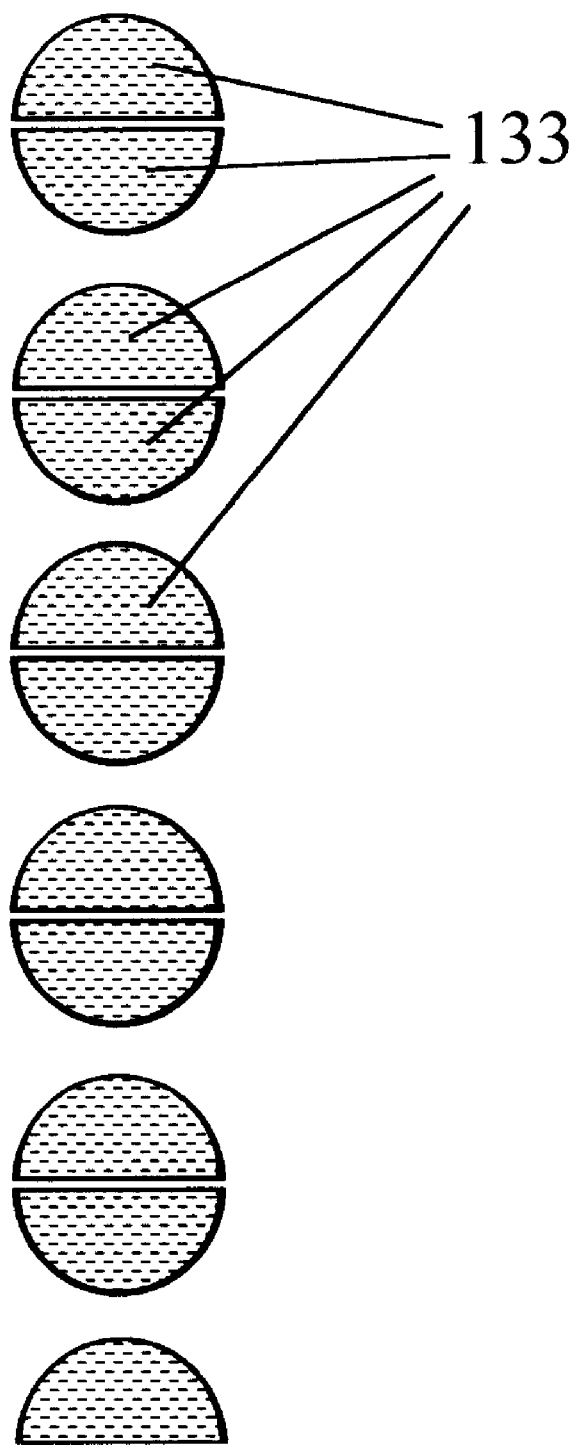
FIG. 28 illustrates fractional parts of a whole number (which formerly possessed an attribute tag) as it stands aside from the number and is combined to show addition of fractions.

Multiplication problems involving a fraction and a two, three or four digit number can also be readily represented and solved according to the method of the present invention. FIG. 27 shows a modified version of the number eleven shown in FIG. 14. Specifically, in FIG. 27, modified markers 122' and 127' have been substituted for the markers 122 of the attribute tag 120 and the marker 127 of FIG. 14. Each marker 122' and 127' has been divided into two visually distinct half markers, a darker half marker 133 and a lighter half marker 133'. This division can be carried out in numerous ways. For example, a darker half marker 133 can be applied or adhered to a marker 122 or 127. Alternatively, half of a marker 122 or 127 can be shaded. In any case, FIG. 27 is a representation of the multiplication problem eleven times one half In FIG. 28, the darker half markers 133 have been regrouped into five and one half whole markers, representing the solution to the multiplication problem eleven times one half as well as the solution to the division problem eleven divided by two. FIG. 28 shows addition of eleven of the one half markers 133.

Figure 29:
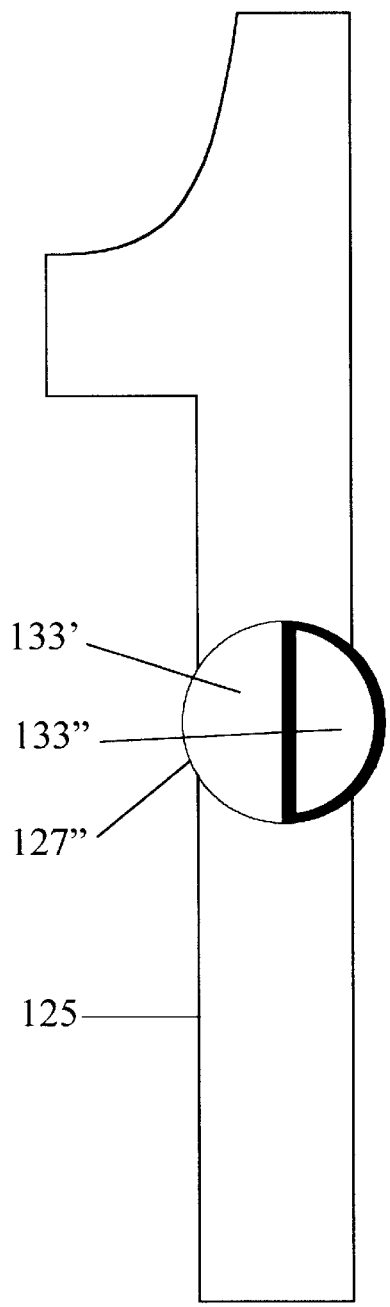
FIG. 29 illustrates a step in a method according to the present invention for representing a fractional part of a fraction.
Figure 30:
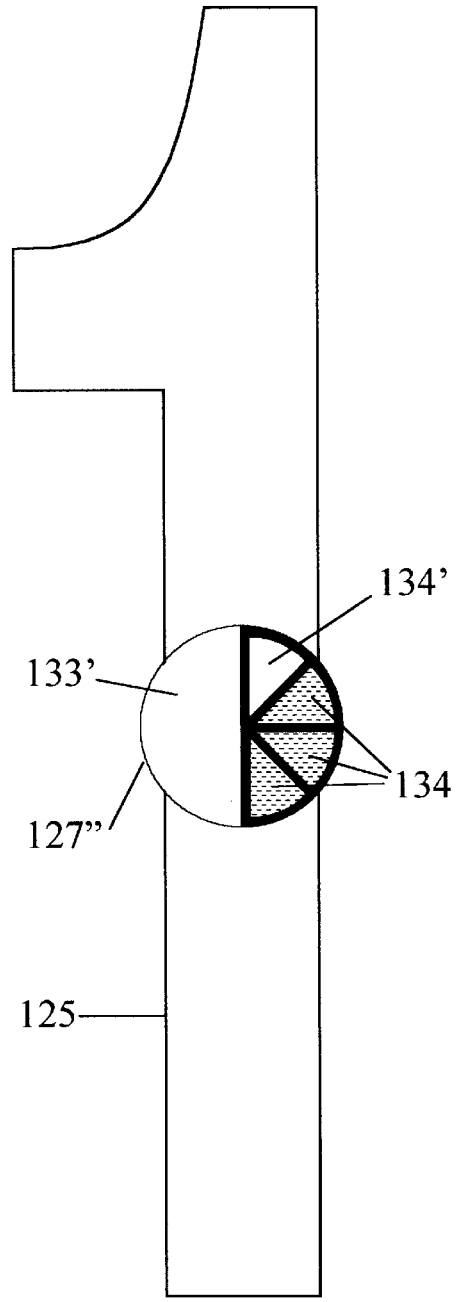
FIG. 30 illustrates a further step in a method according to the present invention for representing a fractional part of a fraction.
Figure 31:
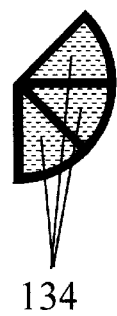
FIG. 31 illustrates fractional parts of a fraction as it stands aside from the number and is combined to show addition of fractions.

Furthermore, fractions can be represented starting with a marker part. FIG. 29 shows digit one 125 with a modified marker 127". A half 133" of marker 127" is heavily outlined and a second half 133' is not outlined. This renders the marker halves 133" and 133' visually distinct. In FIG. 30, the one half marker part 133" is further subdivided into four marker parts, three of which, indicated at 134, are darker and one of which, indicated at 134', is lighter. In other words, three fourths of the half marker 133" has been rendered visually distinct from one fourth of the half marker 133". FIG. 31 shows the three marker parts 134 of the marker half 133" regrouped aside from digit one 125. FIG. 30 and FIG. 31 demonstrate the answer to the multiplication problem one half times three fourths. FIG. 30 and FIG. 31 also demonstrate the answer to the division problem one half divided by four thirds. FIG. 31 shows addition of one eighth, plus one eighth, plus one eighth.

Figure 32:
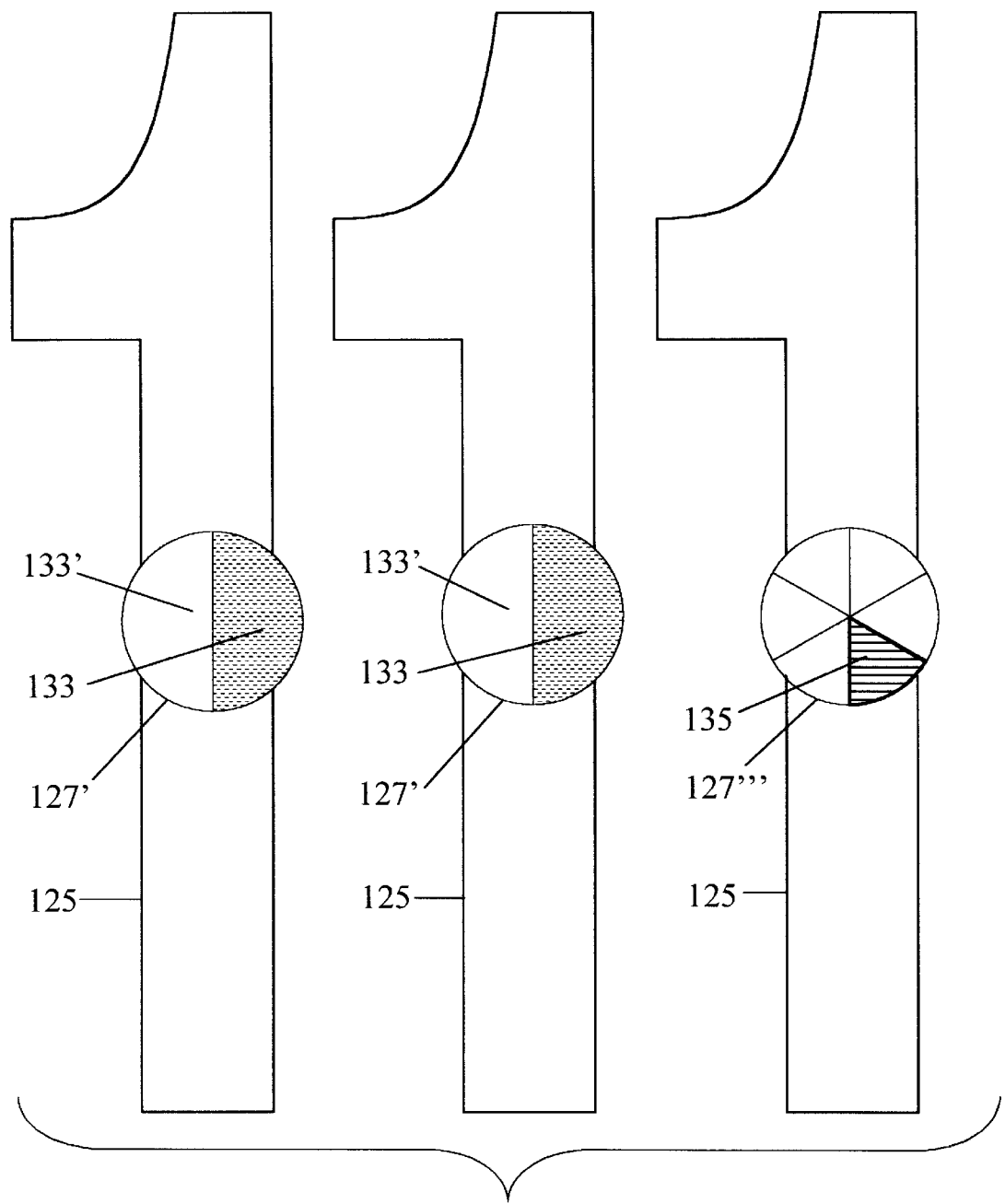
FIG. 32 illustrates a step in a method according to the present invention for representing positive and negative fractions.
Figure 33:
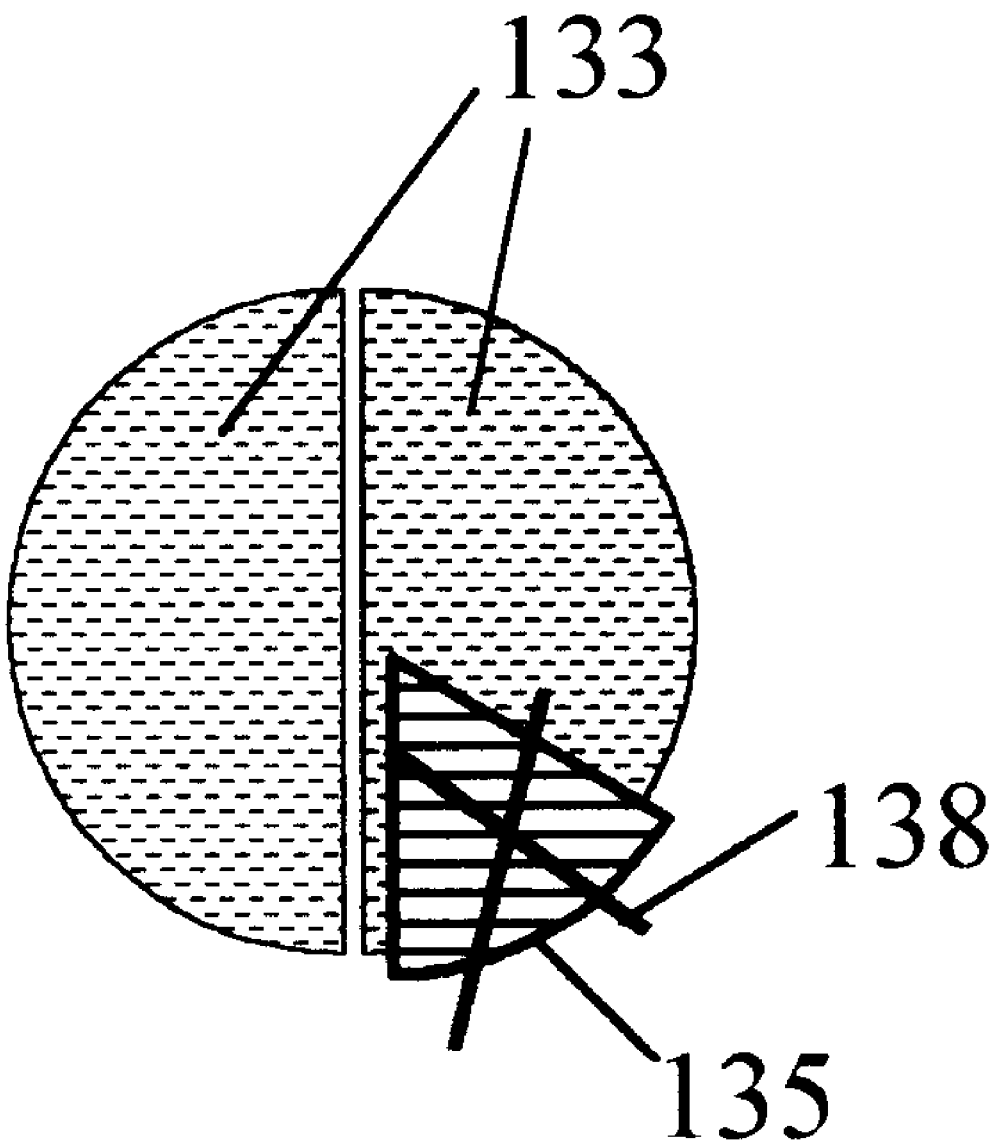
FIG. 33 illustrates a step in a method according to the present invention for adding and subtracting fractions

Whole markers and marker parts can be used to demonstrate addition and subtraction of fractions. FIG. 32 shows two digits one 125, each having a modified marker (as in FIG. 27) which has been divided into two visually distinct half markers, a darker half marker 133 and a lighter half marker 133'. Each represents the fraction one half Also shown in FIG. 32 is a digit one 125 including a modified marker 127"' which has been divided into six parts, one of which is indicated at 135 and has been rendered visually distinct from the other parts, to indicate that it is a negative one sixth. In FIG. 33, the one half marker parts 133 have been grouped together and the marker part 135 has been positioned to obliterate a corresponding portion of one of the one half marker parts 133. That is to say, the marker part 135 (representing a negative one sixth) covers a corresponding portion of one of the marker halves 133, each canceling the other and this is further indicated in FIG. 33 by an "X" 138 or the like. FIG. 33 provides, therefore, a visual representation of the solution to the problem one half plus one half minus one sixth.

Addition, subtraction, multiplication, division, both of whole numbers and of fractions can be carried out with negative markers as well as with positive markers. The same rules that apply in mathematics with negative numbers such as the multiplication of two negative numbers to form a positive number also applies in this invention.

Figure 34:
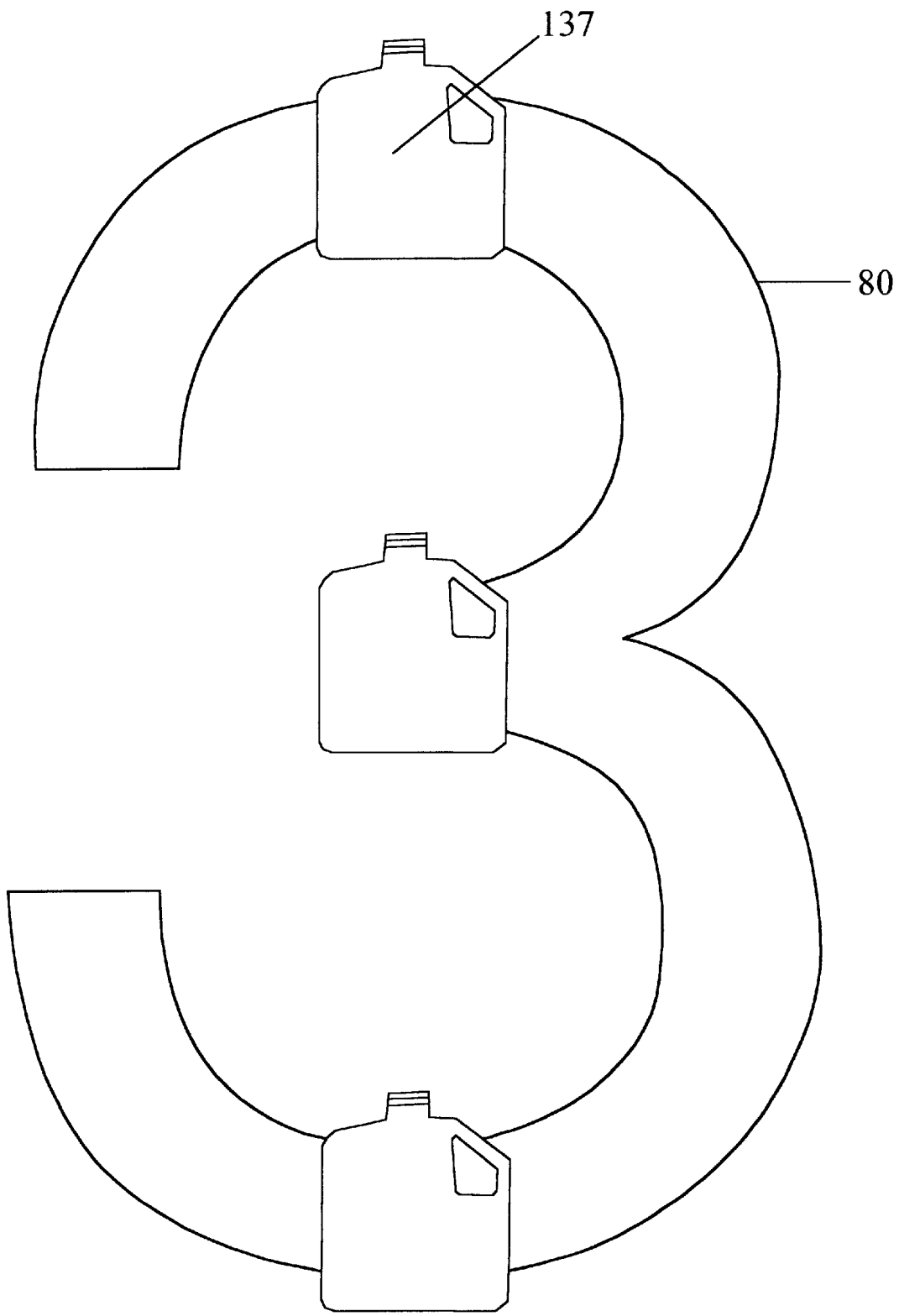
FIG. 34 illustrates a large digit three enhanced with markers alternatively shaped.

The present invention can be used to introduce and represent units of measure. For example, attribute tags and digits can include markers representing various units such as cups, pints, quarts and gallons. These markers may take the shape or imprint of the various units of measure such as the shape of a gallon 137 (FIG. 34) stamped on all the markers 82 of digit three 80 (FIG. 11). These tags and digits can be used, as described above, to represent and solve mathematical problems involving these units, taking into account the relationships between the units represented by the various markers. Another example of this would be markers in the form of segmented rectangles to demonstrate decimals/fractions. Units of time can also be represented by markers in attribute tags and digits according to the present invention. Again, these would be used as described above, taking into account the relationships between units of time such as seconds, minutes and hours.

Figure 35:
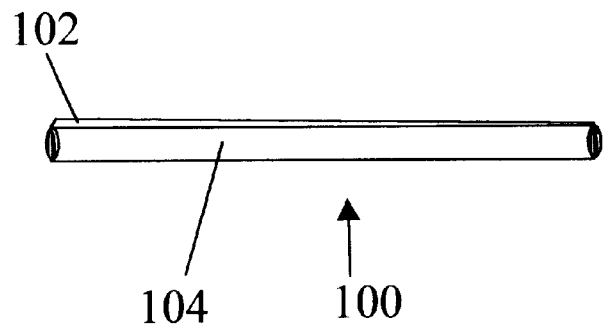
FIG. 35 illustrates a sticky pick for use in practicing the methods of the present invention

In SUBTRACTION WORKBOOK 2, discussed above, there is disclosed the use of toothpicks as manipulatives in solving mathematical problems. The present invention contemplates the use of sticky picks made from pieces of tape which have been rolled so that the outside surface is sticky. A sticky pick 100 is illustrated in FIG. 35. The pick comprises a piece of tape 102 rolled up with a sticky side 104 exposed. Ten of these sticky picks 100 may be stuck together in a clump (not shown) to constitute a three dimensional attribute tag. It will be appreciated that attribute tags according to the present invention may take many forms. Essentially, an attribute tag will comprise a number of markers physically connected to each other (as in the case of the sticky picks) or connected to or represented on a common substrate, as in the case of the attribute tags shown in the various drawing Figures. For base ten mathematics, attribute tags having ten markers are used in the methods according to the invention. For other number based systems, for example, base eight, an attribute tag according to the instant invention would have eight markers. As discussed above, the markers may take many forms and may even represent fractions.

Figure 36:
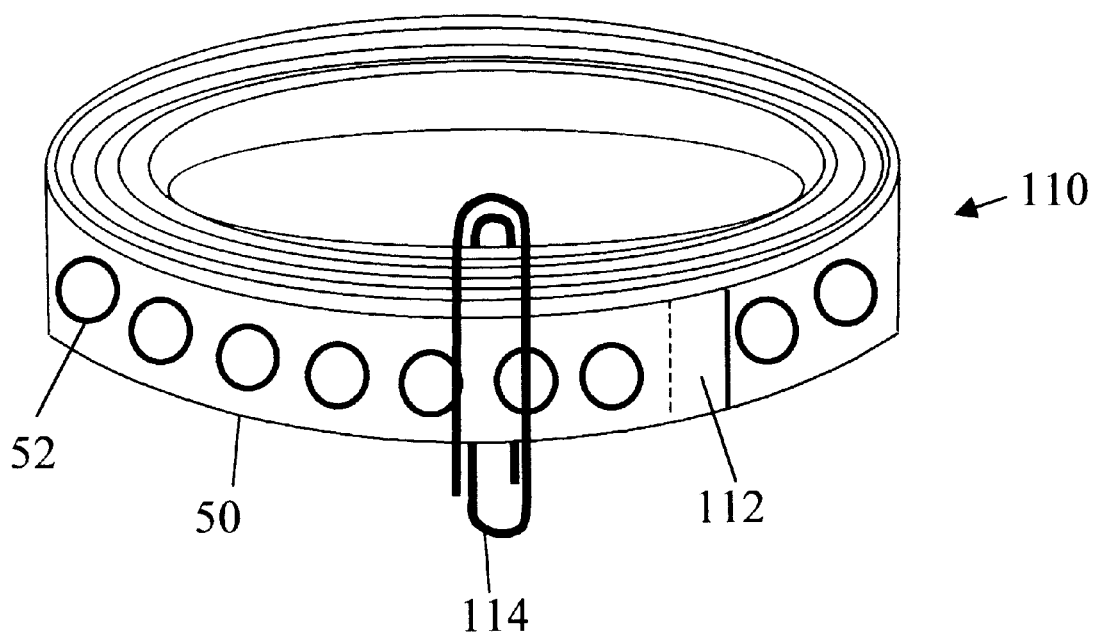
FIG. 36 illustrates an extended attribute tag which is useful in practicing the methods of the present invention for numbers with digits in the hundreds column.

The foregoing examples involve the representation and mathematical manipulation of one and two digit numbers and, in the latter case, attribute tags having ten markers. Three and even four digit numbers can be represented with extended attribute tags. An extended attribute tag 110, for use with digits in the hundreds place, is illustrated in FIG. 36. The extended tag 110 comprises the equivalent of ten attribute tags 50 or ten connected attribute tags 50, each having ten markers 52. The attribute tags 50 have been overlapped and joined, as indicated at 112. In the substrate paper, the tags may be joined with an adhesive, staples, or the like. The extended tag in this instance has been rolled into a cylindrical configuration and may be conveniently retained in that configuration with a clip 114 or twisters. Adhesive may be used to attach the extended tag 110 to a marker on a digit, especially a digit in the hundreds place. Small attribute tags 50 are placed on small digits and large attribute tags 120 are used in the same manner on large digits.

The present invention is also concerned with a kit comprising worksheets, at least two sizes of pre-printed digits enhanced with markers, and two sizes of pre-printed attribute tags with markers comparable to the digit's markers. The two sizes of digits include a set of small digits like those illustrated in FIG. 1 and a set of large digits like the digit three 80 shown in FIG. 11. The height of the large digit three 80 is five or six times the height of the small digits shown in FIG. 1. It is preferred that the height of the large digits be at least about three times the size of the small digits, and, more preferably, four to eight times the height of the small digits. The two sizes of attribute tags include the small attribute tags 50 in FIG. 2 and the large attribute tags 120 in FIG. 13. It is also preferred that the overall size of the small digits be approximately equal to the size of the markers on the large digits. A small digit according to the invention is small enough, relative to a large digit, that the small digit can be placed on the large digit and the large digit can still be recognized.

The digits and attribute tags may be printed on cards which simply means printed on paper type stock, whether it is thick, thin, or in between, or any other suitable substrate.

It will be appreciated that it is desirable for the markers, the digits and the attribute tags to be mutable, i.e., changeable in a visually perceptible way. It will be further appreciated that the objects and advantages of the present invention can be readily achieved by applying the principles described above to images of digits with markers and attribute tags with markers generated by a microprocessor and displayed on a video display terminal, a television screen, a computer monitor or the like and by providing a means which renders them selectively mutable in a visually perceptible way. For example, a marker might appear on a computer monitor as a white circle and a computer program could provide a means by which the marker can be selected and visually altered, by changing color to black, for example, to represent the addition of a negative number as described above. The provision of such microprocessor generation and display of digits with markers and attribute tags with markers is well within the ability of one skilled in the art and will not be described further. In this application, the substrate for the digits, the markers and the attribute tags would be the computer monitor, video display terminal, television screen or the like and the digits and attribute tags would be mutable. As used herein, the term mutable means that a marker, a digit or an attribute tag can be highlighted, divided, covered, adhered to or repositioned to represent numbers and math processes such as the representation of ones, tens, hundreds and thousands columns, addition, multiplication, subtraction and division of whole numbers, fractions, negative whole numbers and negative fractions, as well as decimals, exponents and the like. Markers, digits and attribute tags which are printed on a substrate such as paper are mutable meaning that they can be highlighted, divided, covered, adhered to or repositioned to represent numbers and math processes such as the representation of ones, tens, hundreds and thousands columns, addition, multiplication, subtraction and division of whole numbers, fractions, negative whole numbers and negative fractions, as well as decimals, exponents and the like.

The foregoing description is intended to enable one skilled in the art to make and use the instant invention and not to limit it except by reference to the following claims.

What is claimed is:

1. A kit of materials for teaching mathematics in a given base number system, said kit comprising first sets of similarly sized digits corresponding with the single digit numbers in the given base number system, each of said digits being represented on a mutable substrate, and each digit having a given number of mutable markers provided on each of said digits wherein the given number of said markers provided on each digit corresponds with the numerical value of said digit, and first sets of attribute tags, each of said attribute tags being represented on a mutable substrate and having a given number of mutable markers wherein the number of said markers on said attribute tags corresponds with the base number in the given base number system, wherein said attribute tags are operable, when positioned on one of said digit markers, to cover or replace said digit marker whereby said digits and said attribute tags are operable to represent two digit numbers so that the total number of discernible markers on said digits and said attribute tags is equal to the numerical value of the two digit number.

2. The kit claimed in claim 1 which further comprises second sets of digits which are sized larger than said first sets of digits, said digits in said second sets corresponding with the single digit numbers in the given base number system, each of said digits being represented on a mutable substrate, and each digit having a given number of mutable markers which are sized larger than said markers on said digits in said first sets, said markers being provided on each of said digits wherein the given number of said markers provided on each digit corresponds with the numerical value of said digit, and second sets of attribute tags which are sized larger than said attribute tags in said first sets, each of said attribute tags in said second sets being represented on a mutable substrate and having a given number of mutable markers wherein the number of said markers on said attribute tags corresponds with the base number in the given base number system.

3. The kit claimed in claim 2 wherein said markers on said attribute tags of said second sets are sized to correspond generally in size to the markers of said second sets of digits, and are also sized to correspond generally in size to said digits of said first sets and wherein said markers of said attribute tags of said first sets are sized to correspond generally in size to said markers of said digits in said first sets.

4. A method for representing a number, in a given base number system, which has at least two digits, said method comprising the steps of juxtaposing a first digit and a second digit which make up the first two digits of the number, each of said digits being selected from a set of digits each having a number of mutable markers corresponding with the value of each digit, so that said first digit is to the left of said second digit, positioning, on each of said markers on said first digit an attribute tag having a number of markers corresponding with the base number of said given number system represented on a mutable substrate, whereby each marker on said first digit is covered or replaced by the attribute tag positioned thereon and the total number of markers showing on said attribute tags and on said second digit is equal to the numerical value of the represented number.

5. A method for representing the product of the multiplication of a first single digit factor and a second single digit factor in a given base number system, said method comprising the steps of for the first factor, selecting a first digit representing the first factor from a first set of similarly sized digits corresponding with the single digit numbers in the given base number system, each of said digits being represented on a mutable substrate, and each digit having a given number of mutable markers provided on each of said digits wherein the given number of said markers provided on each digit corresponds with the numerical value of said digit, for the second factor, selecting a quantity of second digits, the quantity corresponding with the numerical value of the first factor, representing the second factor from a second set of similarly sized digits corresponding with the single digit numbers in the given base number system, each of said digits being represented on a mutable substrate, and each digit having a given number of markers provided on each of said digits wherein the given number of said markers provided on each digit corresponds with the numerical value of said digit, wherein the digits in the second set correspond generally in size with the markers on the digits of the first set, and positioning one of the second digits on each marker of the first digit so that it obscures or replaces the marker of the first digit, whereby the product of the first and second factors is represented by the number of markers which are visible.

6. A method for representing a fraction of a single digit whole number in a given base number system, said method comprising the steps of selecting a digit representing the whole number from a first set of similarly sized digits corresponding with the single digit numbers in the given base number system, each of said digits being represented on a mutable substrate and each digit having a given number of mutable markers provided on each of said digits wherein the given number of said markers provided on each digit corresponds with the numerical value of said digit, covering or shading a fractional portion of each marker on the selected digit wherein the fractional portion is sized, relative to the size of the marker, so that the ratio of the former to the latter equals the fraction.

7. The method claimed in claim 6 wherein, after the fractional portions of each marker are shaded or covered, the fractional portions are grouped together so far as possible to correspond with whole markers.

* * * * *